United States Patent
Sakemi et al.

(10) Patent No.: US 9,386,017 B2
(45) Date of Patent: Jul. 5, 2016

(54) AUTHENTICATION DEVICE, SYSTEM AND METHOD

(71) Applicant: FUJITSU LIMITED, Kawasaki-shi, Kanagawa (JP)

(72) Inventors: Yumi Sakemi, Kawasaki (JP); Tetsuya Izu, London (GB); Masahiko Takenaka, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/270,495

(22) Filed: May 6, 2014

(65) Prior Publication Data

US 2014/0351597 A1  Nov. 27, 2014

(30) Foreign Application Priority Data

May 23, 2013  (JP) .................................. 2013-109243

(51) Int. Cl.
*H04L 9/32* (2006.01)
*H04L 29/06* (2006.01)

(52) U.S. Cl.
CPC ........ *H04L 63/0861* (2013.01); *H04L 63/0853* (2013.01)

(58) Field of Classification Search
CPC . H04L 29/06; H04L 63/1416; H04L 63/1425; H04L 63/0861; H04L 63/0853
USPC ......................................................... 713/171
See application file for complete search history.

(56) References Cited

U.S. PATENT DOCUMENTS

| 8,443,201 | B2* | 5/2013 | Takahashi et al. | 713/186 |
|---|---|---|---|---|
| 2002/0126882 | A1* | 9/2002 | Funahashi | 382/124 |
| 2003/0138136 | A1* | 7/2003 | Umezaki et al. | 382/124 |
| 2007/0071234 | A1* | 3/2007 | Lagrange et al. | 380/28 |
| 2010/0217980 | A1* | 8/2010 | Komorita et al. | 713/168 |
| 2011/0123072 | A1* | 5/2011 | Moon et al. | 382/125 |
| 2011/0185171 | A1* | 7/2011 | Karasawa et al. | 713/156 |
| 2012/0314911 | A1* | 12/2012 | Paul et al. | 382/115 |

(Continued)

FOREIGN PATENT DOCUMENTS

| JP | 2001-331448 | 11/2001 |
|---|---|---|
| JP | 2004-229105 | 8/2004 |

(Continued)

OTHER PUBLICATIONS

W. W. Boles; A Human Identification Technique Using Images of the Iris and Wavelet Transform; Year:1998; IEEE; p. 1185-1188.*

(Continued)

*Primary Examiner* — Monjour Rahim
(74) *Attorney, Agent, or Firm* — Staas & Halsey LLP

(57) ABSTRACT

An authentication device includes: a memory; and a processor coupled to the memory and configured to: when a registration request including authentication information to be used during authentication is received from a terminal device, generate registration information using the authentication information and key information and store the registration information in the memory, and when an authentication request including input information to be handled as the target of the authentication is received from the terminal device, generate a result of the authentication based on the input information, the registration information, and the key information, and transmit the result of the authentication to the terminal device.

5 Claims, 23 Drawing Sheets

(56) References Cited

U.S. PATENT DOCUMENTS

2013/0174243 A1* 7/2013 Inatomi ............... H04L 9/3231
                                                                726/7
2013/0179688 A1* 7/2013 Lee et al. ...................... 713/168

FOREIGN PATENT DOCUMENTS

| JP | 2005-130384 | 5/2005 |
| JP | 2008-185616 | 8/2008 |

OTHER PUBLICATIONS

Michael Braithwaite et al., "Application-Specific Biometric Templates", IEEE Workshop on Automatic Identification Advanced Technologies, Tarrytown, NY, Mar. 14-15, 2002, pp. 1-10.

Haruki Ota et al., "Proposal of an Iris Identification Scheme Protecting Privacy", Computer Security Symposium 2003, Oct. 2003, pp. 163-169.

* cited by examiner

FIG. 6

| USER ID | REGISTRATION INFORMATION |
|---------|--------------------------|
| A | $E_{KA2}(E_{KA1}(mA))$ |
| B | $E_{KB2}(E_{KB1}(mB))$ |
| ... | ... |

2071 — USER ID
2072 — REGISTRATION INFORMATION

AUTHENTICATION DEVICE, SYSTEM AND METHOD

CROSS-REFERENCE TO RELATED APPLICATION

This application is based upon and claims the benefit of priority of the prior Japanese Patent Application No. 2013-109243, filed on May 23, 2013, the entire contents of which are incorporated herein by reference.

FIELD

The embodiments discussed herein are related to a technology for user authentication.

BACKGROUND

An authentication technology for authenticating a user on a network is available. Password information, biometric information, or other information to be checked during an authentication is preregistered so that input information is compared against the preregistered information during the authentication. The authentication is determined to be either successful or unsuccessful depending on the result of comparison. The authentication technology described above is used, for instance, for an authentication function exercised in a banking system and for an authentication function for electronic commerce and electronic payment.

In some cases, the information to be checked and the input information are encrypted. In a biometric authentication system, for example, encrypted biometric data is registered as registration information. The biometric authentication system uses the degree of similarity between authentication target information, which is obtained by encrypting separately measured biometric data, and the registration information to perform an authentication with the biometric data kept secret. The above-described biometric authentication system is disclosed, for instance, in Japanese Laid-open Patent Publication No. 2005-130384 and in Haruki Ota et al., "Proposal of an Iris Identification Scheme Protecting Privacy", Computer Security Symposium 2003, October 2003.

More specifically, a terminal in the biometric authentication system acquires an iris code from an image having biometric information at the time of registration and computes the exclusive OR of a random number and the iris code. Further, the terminal transmits the result of computation to a server. The server then registers the received computation result in a database as registration information.

Next, at the time of authentication, the terminal acquires the iris code from the image and computes the exclusive OR of the same random number and iris code used at the time of registration. Next, the terminal transmits the result of computation, that is, the authentication target information, to the server. The server then computes the exclusive OR of the authentication target information and the registration information. The result of computation represents a hamming vector of the iris code derived from the image used at the time of registration and the iris code derived from the image used at the time of authentication. This hamming vector removes the effect of the random number. Consequently, the server is able to determine whether or not the authentication is successful without decryption of the encrypted biometric data.

SUMMARY

According to an aspect of the invention, an authentication device includes: a memory; and a processor coupled to the memory and configured to: when a registration request including authentication information to be used during authentication is received from a terminal device, generate registration information using the authentication information and key information and store the registration information in the memory, and when an authentication request including input information to be handled as the target of the authentication is received from the terminal device, generate a result of the authentication based on the input information, the registration information, and the key information, and transmit the result of the authentication to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an exemplary data structure of a registration information management table;

DESCRIPTION OF EMBODIMENTS

If registration information managed by a server leaks, a third party is allowed to perform spoofing in the above-described biometric authentication system. More specifically, the third party is allowed to transmit the acquired registration information to the server at the time of authentication. The server then computes the exclusive OR of the registered registration information and registration information received as authentication target information. In this instance, the hamming distance, which is the result of computation, is "0". Thus, the authentication is determined to be successful. This permits the third party to perform spoofing by using the acquired registration information.

A technology disclosed by an embodiment makes it possible to keep a third party from performing spoofing by using leaked registration information.

Hereinafter, embodiments will be described in detail. The embodiments described below may be combined as appropriate as far as involved processes do not conflict with each other. Individual embodiments will now be described with reference to the accompanying drawings.

First Embodiment

Figure 1:
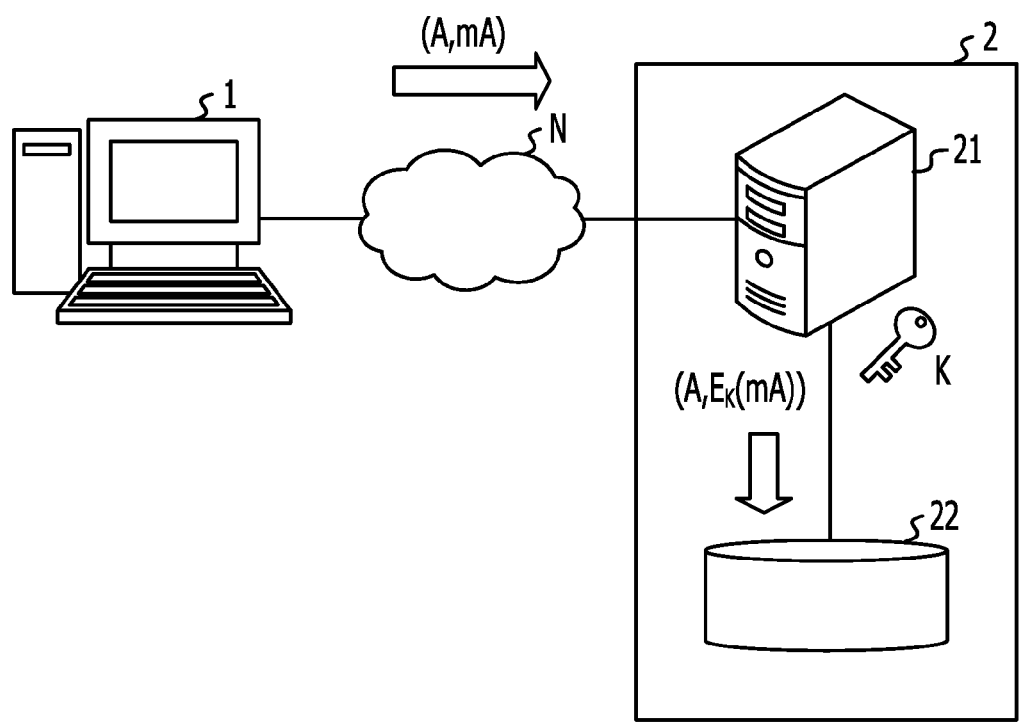
FIG. 1 is a diagram illustrating a registration process performed in an authentication system according to a first embodiment.

FIG. 1 is a diagram illustrating a registration process performed in an authentication system according to a first embodiment. First of all, the authentication system according to the present embodiment will be described. The authentication system includes a terminal device 1 and an authentication device 2. The terminal device 1 and the authentication device 2 are connected through a network N. The network N is, for example, the Internet.

The terminal device 1 is a computer that requests the authentication device 2 to perform authentication. The authentication device 2 is a computer that performs authentication in compliance with a request from the terminal device 1. The authentication device 2 includes a server 21 and a database 22. The server 21 performs various processes. The database 22 stores information desired for authentication.

A registration process will now be described. The registration process is a process for registering information that is to be checked for subsequent authentication. First of all, the terminal device 1 accepts the input of a user ID "A" of a user to be registered and the input of authentication information "mA" to be registered.

The user ID is information for identifying the user. The authentication information is information used to authenticate the user during subsequent authentication. For example, password information or biometric information may be used as the authentication information. The biometric information may be, for example, iris information, fingerprint information, or vein information. The terminal device 1 includes an interface that accepts the input of various authentication information.

Next, the terminal device 1 transmits the user ID "A" and the authentication information "mA" to the authentication device 2. The authentication information is to be input to the authentication device 2 during the registration process and includes information concerning information for authentication. In the present embodiment, the authentication information is the plain information for authentication. In other words, the authentication information used in the present embodiment is not encrypted information for authentication.

The authentication device 2 receives the user ID "A" and the authentication information "mA". The authentication device 2 then encrypts the authentication information "mA" with key information "K" to generate registration information "$E_K(mA)$". Subsequently, the database 22 stores the user ID "A" and the registration information "$E_K(mA)$" in association with each other.

The registration information is obtained by encrypting the authentication information received from the terminal device 1 with the key information possessed by the authentication device 2. For encryption in the present embodiment, the same computation based on the same key information is performed two times to remove the effect of the first computation based on the key information.

For example, the encryption is performed in accordance with the exclusive OR of a random number generated in accordance with the key information K and the authentication information "mA". Alternatively, the encryption may be performed in accordance with the exclusive OR of the key information K and the authentication information "mA". When the encryption based on the exclusive OR is adopted as described above, the amount of processing computations performed by each device may be decreased in the registration process and in the later-described authentication process. The use of the encryption based on the exclusive OR also makes it possible to keep the size of data from being increased by encryption.

Figure 2:
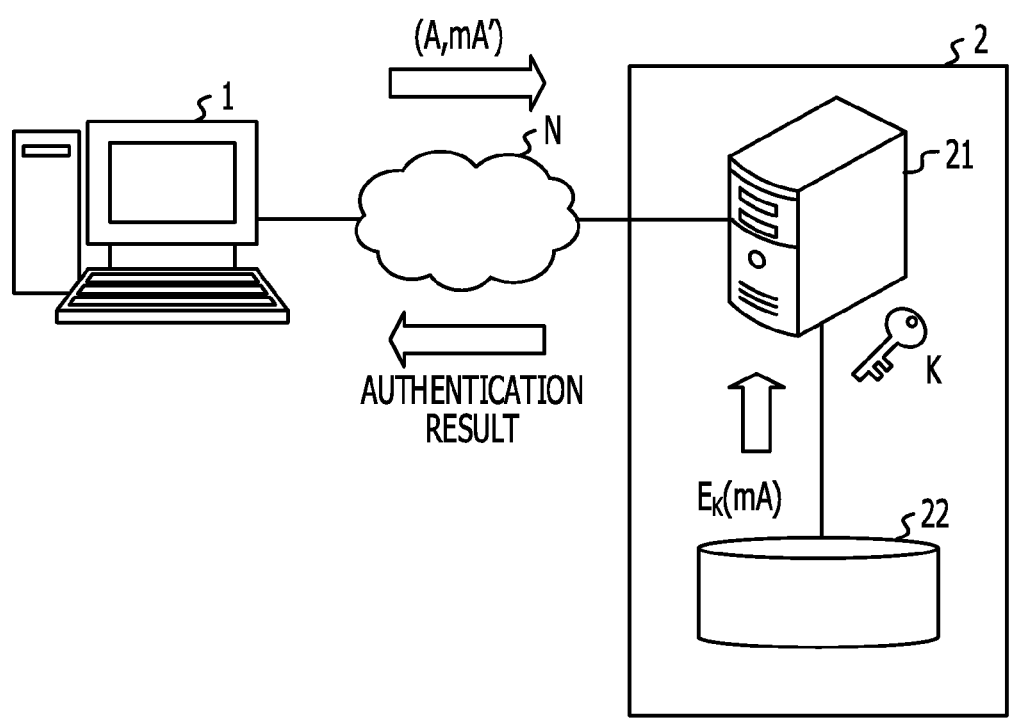
FIG. 2 is a diagram illustrating an authentication process performed in the authentication system according to the first embodiment.

FIG. 2 is a diagram illustrating the authentication process performed in the authentication system according to the first embodiment. The terminal device 1 accepts the input of the user ID "A" of the user to be authenticated and the input of authentication target information "mA'", which is to be authenticated. The authentication target information is retained by an authorized user only and may be, for example, password information or biometric information. However, the authentication target information is of the same type and format as the information for authentication.

Subsequently, the terminal device 1 transmits the user ID "A" and the input information "mA'" to the authentication device 2. The input information is to be input to the authentication device 2 during the authentication process and includes information concerning the authentication target information. In the present embodiment, the input information is the plain authentication target information.

The authentication device 2 reads the registration information "$E_K(mA)$" associated with the user ID "A" and computes the result of comparison between the input information "mA'" and the registration information "$E_K(mA)$". In this instance, the result of comparison is obtained by the same computation method as for encryption. For example, the authentication device 2 computes the exclusive OR of the input information "mA'" and the registration information "$E_K(mA)$".

Further, the authentication device 2 performs authentication by using the comparison result and the key information "K". The authentication device 2 then transmits the result of authentication to the terminal device 1. For example, the authentication device 2 acquires the hamming vector of the information for authentication and the authentication target information by decrypting the result of computation of the exclusive OR with the key information "K". The hamming vector is information indicative of the degree of similarity between the information for authentication and the authentication target information. For example, the degree of similarity between the information for authentication and the authentication target information increases with a decrease in the number of hamming vector bits indicative of "1".

In the present embodiment, the exclusive OR of the input information "mA'" and the registration information "$E_K$(mA)" is equivalent to a value obtained by encrypting the exclusive OR of the authentication target information "mA'" and the information for authentication "mA" with the key information "K". The exclusive OR of the authentication target information "mA'" and the information for authentication "mA" represents the hamming vector of the information for authentication "mA" and the authentication target information "mA'". Therefore, the hamming vector is obtained when the exclusive OR of the input information "mA'" and the registration information "$E_K$(mA)" is decrypted with the key information K. The authentication device 2 then compares the number of hamming vector bits indicative of "1" against a threshold value "T" to determine whether or not the authentication is successful. If, for instance, the number of hamming vector bits indicative of "1" is not smaller than the threshold value "T", the authentication is determined to be unsuccessful.

Even if the registration information "$E_K$(mA)" registered in the database 22 leaks in the present embodiment, a third party is unable to perform spoofing. More specifically, if, for instance, the third party replaces the input information with illegally acquired registration information "$E_K$(mA)" in a communication path between the terminal device 1 and the authentication device 2 at the time of authentication, the user ID "A" and the input information "$E_K$(mA)" are input to the authentication device 2.

The authentication device 2 then computes the result of comparison between the input information "$E_K$(mA)" and the registration information "$E_K$(mA)" about the user "A". In this instance, the result of comparison indicates that the registration information "$E_K$(mA)" is in agreement with the input information "$E_K$(mA)".

In the present embodiment, however, the authentication device 2 further performs authentication with the key information "K" applied to the comparison result. Therefore, computations based on the key information "K" are additionally performed. Consequently, even if the comparison result indicates that the registration information "$E_K$(mA)" is in agreement with the input information "$E_K$(mA)", the authentication initiated by the third party may be determined to be unsuccessful.

Here, the key information "K" is preferably determined in accordance with the threshold value "T" used for authentication. For example, the key information "K" is generated so that T or more bits of the key information "K" indicate "1", and that T or more bits of the random number generated in accordance with the key information "K" indicate "1". The threshold value "T" is set as appropriate in accordance with the amount of data of the information for authentication and the authentication target information and with demanded authentication strength.

Figure 3:
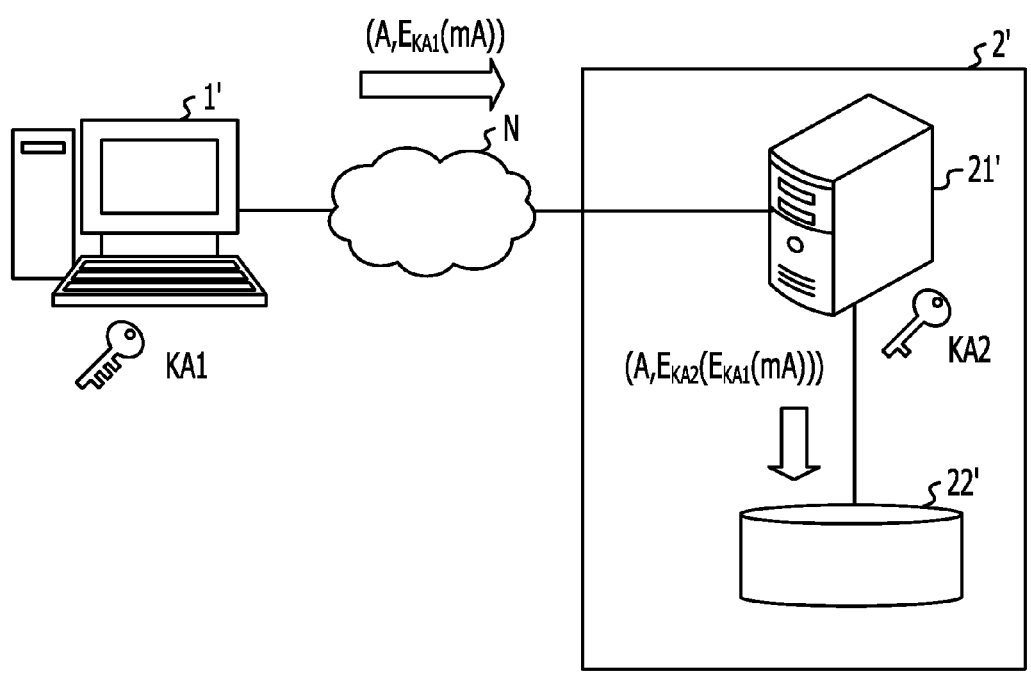
FIG. 3 is a diagram illustrating the registration process performed in a modification of the first embodiment.

A modification of the first embodiment will now be described. FIG. 3 is a diagram illustrating the registration process performed in the modification of the first embodiment. The authentication system according to the modification of the first embodiment includes a terminal device 1' and an authentication device 2'.

In the modification of the first embodiment, the information for authentication and the authentication target information are encrypted and communicated between the terminal device 1' and the authentication device 2' to provide increased security. In other words, the terminal device 1' has an encryption function. Although the terminal device 1 depicted in FIGS. 1 and 2 does not perform encryption, the use of a secure communication channel makes it possible to ensure that the information for authentication and the authentication target information are kept secret to a certain extent. For example, information to be communicated is encrypted with secure socket layer (SSL).

In the modification of the first embodiment, it is assumed that the key information to be used for encryption varies from one user to another. For example, key information "KA", which is associated with the user ID "A", is used. However, common key information may be used for a plurality of users. Hereinafter, it is assumed that the key information used in the terminal device 1' in association with the user ID "A" is "KA1", and that the key information used in the authentication device 2' in association with the user ID "A" is "KA2".

For example, the terminal device 1' and the authentication device 2' store, in advance, individual user IDs and key information in association with each other. Alternatively, the terminal device 1' and the authentication device 2' may generate user-specific key information KA in accordance with user IDs and auxiliary information. The auxiliary information is used to generate the key information. The auxiliary information is preferably secret. For example, a password-based key derivation function is used to generate the key information.

However, the key information "KA1" generated for a certain user A in the registration process is identical with the key information "KA1" generated for the same user A in the authentication process. Further, the key information "KA2" generated for a certain user A in the registration process is identical with the key information "KA2" generated for the same user A in the authentication process.

The key information "KA1" used by the terminal device 1' is different from the key information "KA2" used by the authentication device 2'. In other words, although the terminal device 1' uses the key information "KA1" to encrypt the information for authentication and the authentication target information, the authentication device 2' is unable to decrypt the information for authentication and the authentication target information because it does not have the key information "KA1". Hence, biometric information or other information for authentication is kept secret from the authentication device 2'. The biometric information is unalterable unlike password information. Therefore, the biometric information is protected with higher security level.

First of all, referring to FIG. 3, the terminal device 1' accepts the input of a user ID "A" and the input of authentication information "mA". The terminal device 1' then generates authentication information "$E_{KA1}$(mA)" by encrypting the information for authentication "mA" with the key information "KA1" associated with the user ID "A". Next, the terminal device 1' transmits the user ID "A" and the authentication information "$E_{KA1}$(mA)" to the authentication device 2'. Unlike the authentication information according to the foregoing embodiment, the authentication information according to the modification is not plain information for authentication, but is the information for authentication that is encrypted with the key information "KA1".

Next, the authentication device 2' receives the user ID "A" and the authentication information "$E_{KA1}(mA)$". The authentication device 2' then generates registration information "$E_{KA2}(E_{KA1}(mA))$" by encrypting the authentication information "$E_{KA1}(mA)$" with the key information "KA2". Subsequently, the database 22' stores the user ID "A" and the registration information "$E_{KA2}(E_{KA1}(mA))$" in association with each other.

Figure 4:
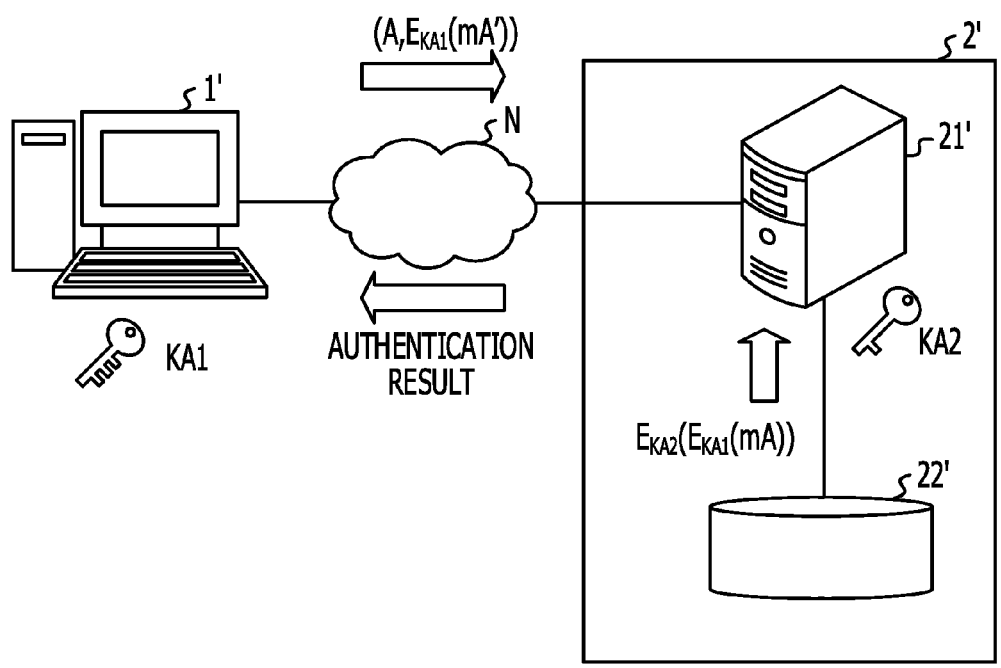
FIG. 4 is a diagram illustrating the authentication process performed in the modification of the first embodiment.

FIG. 4 is a diagram illustrating the authentication process performed in the modification of the first embodiment. The terminal device 1' accepts the input of the user ID "A" of the user to be authenticated and the input of the authentication target information "mA'". The terminal device 1' generates input information "$E_{KA1}(mA')$" by encrypting the authentication target information "mA'" with the key information KA1 associated with the user ID "A". The terminal device 1' then transmits the user ID "A" and the input information "$E_{KA1}(mA')$" to the authentication device 2'. Unlike the input information according to the foregoing embodiment, the input information according to the modification is not plain authentication target information, but is the authentication target information encrypted with the key information "KA1".

Upon receipt of the user ID "A" and the input information "$E_{KA1}(mA')$", the authentication device 2' reads the registration information "$E_{KA2}(E_{KA1}(mA))$" associated with the user ID "A" and computes the result of comparison between the input information "$E_{KA1}(mA')$" and the registration information "$E_{KA2}(E_{KA1}(mA))$". For example, the authentication device 2' computes the exclusive OR of the input information "$E_{KA1}(mA')$" and the registration information "$E_{KA2}(E_{KA1}(mA))$". Further, the authentication device 2' performs authentication by using the result of comparison and the key information "KA2". Subsequently, the authentication device 2' transmits the result of authentication to the terminal device 1'.

Here, the effect of encryption by the key information "KA1" is removed from the result of computing the exclusive OR of the input information "$E_{KA1}(mA')$" and the registration information "$E_{KA2}(E_{KA1}(mA))$" so that the exclusive OR (hamming vector) of the information for authentication "mA" and the authentication target information "mA'" corresponds to information encrypted with the key information "KA2". The authentication device 2' is able to acquire the hamming vector by decrypting the comparison result with the key information "KA2". The method of encryption by the terminal device 1' and the authentication device 2' is not limited to the one based on the exclusive OR. As mentioned earlier, any encryption method may be used as far as the effect of encryption is removed by performing the same computation two times with the same key information.

As described above, the modification of the first embodiment makes it possible to avoid spoofing based on leaked registration information and provides increased security for the information for authentication and the authentication target information. Particularly, if biometric information is used as the information for authentication and the authentication target information, it is unalterable unlike a password and the like. It is therefore preferred that increased security be provided for the biometric information.

Figure 5:
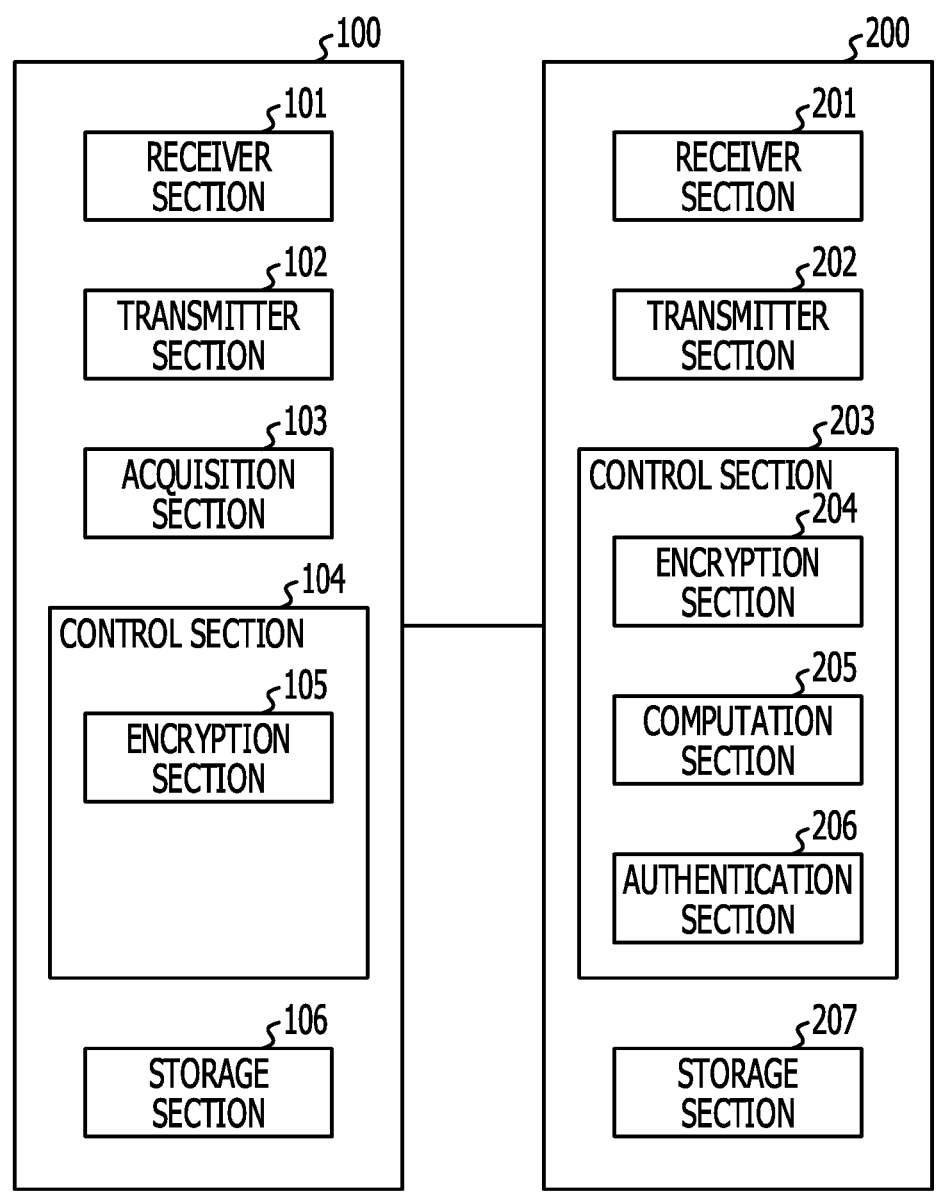
FIG. 5 is a functional block diagram illustrating a terminal device and authentication device according to the first embodiment.

The functional configurations of the terminal device and authentication device according to the first embodiment will now be described. FIG. 5 is a functional block diagram illustrating the terminal device and authentication device according to the first embodiment. A terminal device 100 depicted in FIG. 5 is equivalent to the terminal device 1' according to the modification of the first embodiment. However, the terminal device 100 may be the terminal device 1. An authentication device 200 depicted in FIG. 5 is equivalent to the authentication device 2' according to the modification of the first embodiment. However, the authentication device 200 may be the authentication device 2.

The terminal device 100 includes a receiver section 101, a transmitter section 102, an acquisition section 103, a control section 104, and a storage section 106. The receiver section 101 is a processing section that receives information from the authentication device 200. In the authentication process, for example, the receiver section 101 receives the result of authentication from the authentication device 200.

The transmitter section 102 is a processing section that transmits information to the authentication device 200. In the registration process, for example, the transmitter section 102 transmits a registration request to the authentication device 200. The registration request is information that includes a user ID and authentication information and is used to request the authentication device 200 to register the registration information. In the authentication process, the transmitter section 102 transmits an authentication request to the authentication device 200. The authentication request is information that includes a user ID and input information and is used to request the authentication device 200 to perform authentication.

The acquisition section 103 is a processing section that acquires the information for authentication and the authentication target information. The acquisition section 103 acquires an image and an input password from an imaging device, which picks up an image, and from an input device, which accepts the input of a password and the like. If, for instance, biometric information is used as the information for authentication, the acquisition section 103 acquires the information for authentication by acquiring the image of a part of a user from a camera and extracting information about feature points from the image.

The control section 104 is a processing section that controls the operation of the terminal device 100. For example, the control section 104 performs the registration process and the authentication process. The control section 104 includes, for example, an encryption section 105. The acquisition section 103 may be a part of the control section 104.

The encryption section 105 is a processing section that performs an encryption process. For example, the encryption section 105 encrypts the information for authentication in the registration process to generate the authentication information. Further, the encryption section 105 encrypts the authentication target information in the authentication process to generate the input information. User-specific key information managed by the terminal device 100 is used for encryption. In the present embodiment, the user-specific key information is stored in the storage section 106 of the terminal device 100. Hence, the encryption section 105 performs encryption by using the key information acquired from the storage section 106.

The storage section 106 stores information that is to be used in the registration process and authentication process. For example, the storage section 106 stores the key information "KA1" in association with the user ID "A".

The encryption section 105 may generate user-specific key information. The encryption section 105 may perform the encryption process by using the generated key information. For example, the password-based key derivation function may be used to generate the key information.

The authentication device 200 includes a receiver section 201, a transmitter section 202, a control section 203, and a storage section 207. The receiver section 201 is a processing section that receives information from the terminal device 100. For example, the receiver section 201 receives a registration request and an authentication request from the terminal device 100.

The transmitter section 202 is a processing section that transmits information to the terminal device 100. For example, the transmitter section 202 transmits an authentication result to the terminal device 100.

The control section 203 is a processing section that controls the operation of the authentication device 200. For example, the control section 203 performs the registration process and the authentication process. The control section 203 includes an encryption section 204, a computation section 205, and an authentication section 206.

The encryption section 204 is a processing section that performs an encryption process. For example, the encryption section 204 encrypts the authentication information in the registration process to generate the registration information. User-specific key information is used for encryption. In the present embodiment, the storage section 207 stores the user-specific key information in association with a user ID. Hence, the encryption section 204 performs encryption by using the key information acquired from the storage section 207. The encryption section 204 uses, for example, a random number generated by a random number generator as the user-specific key information. The generated key information is associated with a user ID and stored in the storage section 207.

The computation section 205 is a processing section that computes the result of comparison between the input information and the registration information. For example, the computation section 205 computes the exclusive OR of the input information and the registration information.

The authentication section 206 is a processing section that performs authentication in accordance with the result of comparison and with the key information. For example, the authentication section 206 acquires the hamming vector of the information for authentication and the authentication target information by decrypting the comparison result with the key information. The authentication section 206 then compares the number of hamming vector bits indicative of "1" against the threshold value "T" to generate the result of authentication.

The storage section 207 stores information that is to be used in the registration process and authentication process. For example, the storage section 207 stores registration information "$E_{KA2}(E_{KA1}(mA))$" in association with the user ID "A". The storage section 207 may further store the key information "KA2" in association with the user ID "A".

FIG. 6 is a diagram illustrating an exemplary data structure of a registration information management table. The registration information management table is stored in the storage section 207.

The registration information management table stores a user ID 2071 and registration information 2072 in association with each other. The user ID is information that identifies a user. The registration information is obtained by encrypting the authentication information received from the terminal device 100 with the key information of the authentication device 200.

Figure 7:
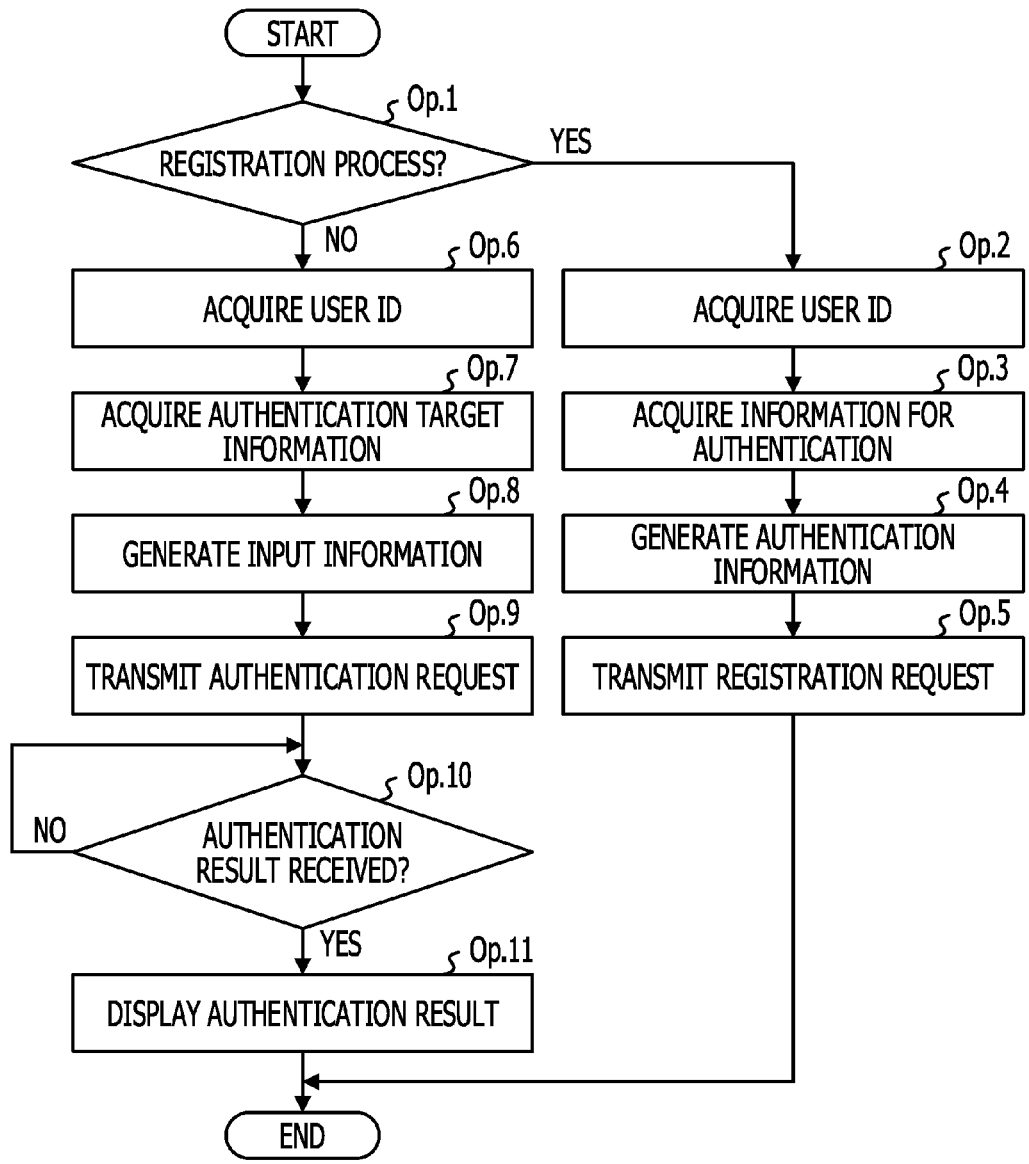
FIG. 7 is a flowchart illustrating a process performed by the terminal device according to the first embodiment.

Processes performed by the devices will now be described. FIG. 7 is a flowchart illustrating a process performed by the terminal device according to the first embodiment.

The control section 104 of the terminal device 100 determines whether or not to perform the registration process (Op. 1). If, for instance, the user inputs a command for starting the registration process, the control section 104 determines to perform the registration process. If, on the other hand, the user does not input the command for starting the registration process, the control section 104 determines not to perform the registration process. In other words, the control section 104 determines to perform the authentication process.

If the registration process is to be performed (if the query in Op. 1 is answered "YES"), the acquisition section 103 acquires a user ID (Op. 2). The user ID is acquired when it is input by the user or when information is read from a card in which an IC chip is built. Next, the acquisition section 103 acquires the information for authentication (Op. 3). The information for authentication is acquired when the camera is controlled to photograph a part of the user's body or when the information for authentication is read from the card in which the IC chip is built in. Op. 2 and Op. 3 may be performed in reverse order.

Next, the encryption section 105 generates the authentication information (Op. 4). For example, the encryption section 105 computes the exclusive OR of the information for authentication and the key information. For example, the encryption section 105 computes the exclusive OR of the information for authentication and a random number generated in accordance with the key information. An initial vector used to generate the random number is also used to perform encryption during the authentication process.

The transmitter section 102 transmits a registration request to the authentication device 200 under the control of the control section 104 (Op. 5). The terminal device 100 then terminates the registration process.

If, on the other hand, the terminal device determines not to perform the registration process (if the query in Op. 1 is answered "NO"), the terminal device performs the authentication process. The terminal device may determine whether or not to perform the authentication process, and then proceed to perform the authentication process. If, in this instance, the terminal device determines not to perform the authentication process, processing returns to Op. 1. First of all, the acquisition section 103 acquires the user ID (Op. 6). The acquisition section 103 then acquires the authentication target information (Op. 7) by the same method as used in the process (Op. 3) for acquiring the information for authentication. Op. 6 and Op. 7 may be performed in reverse order.

Next, the encryption section 105 generates the input information (Op. 8). For example, the encryption section 105 computes the exclusive OR of the authentication target information and the key information. For example, the encryption section 105 computes the exclusive OR of the authentication target information and a random number generated in accordance with the key information. The encryption method used to generate the authentication information is the same as the encryption method used to generate the input information. Further, the same key information is used for authentication information generation and input information generation. The initial vector used for random number generation is the same as the initial vector used for encryption in the preceding registration process.

The transmitter section 102 transmits an authentication request to the authentication device 200 under the control of the control section 104 (Op. 9). Next, the control section 104 determines whether or not the result of authentication is received from the authentication device 200 (Op. 10). The control section 104 waits until the authentication result is received (if the query in Op. 10 is answered "NO"). When the authentication result is received (when the query in Op. 10 is answered "YES"), the control section 104 causes a display device to display the authentication result (Op. 11). The terminal device 100 then terminates the authentication process.

Figure 8:
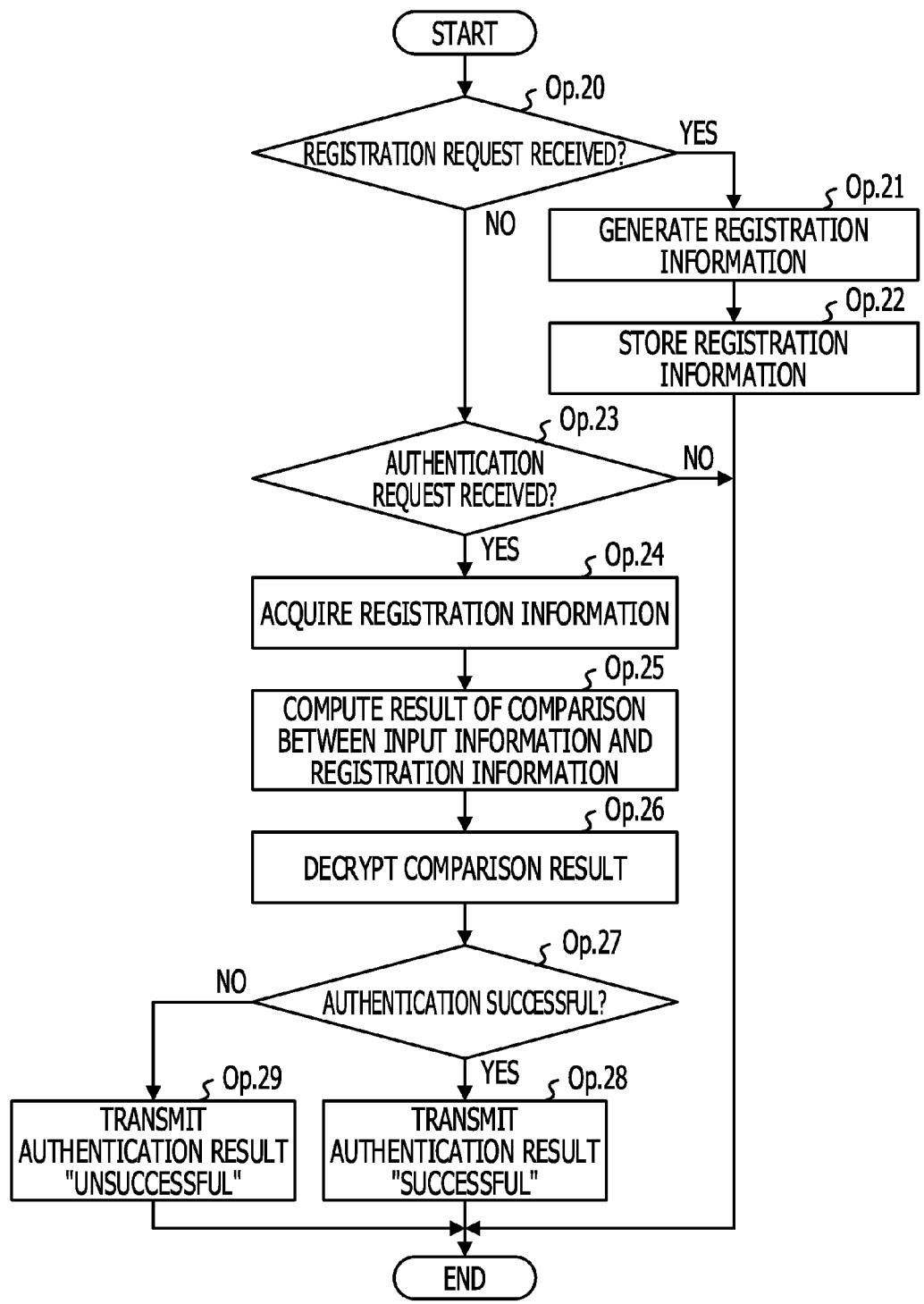
FIG. 8 is a flowchart illustrating a process performed by the authentication device according to the first embodiment.

FIG. 8 is a flowchart illustrating a process performed by the authentication device according to the first embodiment. The control section 203 determines whether or not the registration request is received (Op. 20). This determination is based, for instance, on whether flag information indicative of the registration request is included in the information received by the receiver section 201.

If the registration request is received (if the query in Op. 20 is answered "YES"), the encryption section 204 generates the registration information (Op. 21). For example, the encryption section 204 acquires the user ID included in the registration information and acquires the key information associated with the user ID. The encryption section 204 then generates the registration information by encrypting the authentication information with the key information.

The encryption section 204 causes the storage section 207 to store the registration information in association with a user ID (Op. 22). The authentication device 200 then terminates the registration process.

If, on the other hand, the registration request is not received (if the query in Op. 20 is answered "NO"), the control section 203 determines whether or not the authentication request is received (Op. 23). This determination is based, for instance, on whether flag information indicative of the authentication request is included in the information received by the receiver section 201.

If the authentication request is not received (if the query in Op. 23 is answered "NO"), processing comes to an end. If, on the other hand, the authentication request is received (if the query in Op. 23 is answered "YES"), the computation section 205 acquires the registration information associated with a user ID included in the authentication request from the storage section 207 (Op. 24).

Next, the computation section 205 computes the result of comparison between the input information included in the authentication request and the registration information (Op. 25). For example, the computation section 205 computes the exclusive OR of the input information and the registration information. The result of computation corresponds to information that is obtained when the hamming vector of the information for authentication and the authentication target information is encrypted with the key information used to generate the registration information (Op. 21).

Next, the authentication section 206 decrypts the comparison result (Op. 26) by using the key information used to generate the registration information (Op. 21). The authentication section 206 compares the result of decryption against a threshold value to determine whether or not the authentication is successful (Op. 27).

If the authentication is successful (if the query in Op. 27 is answered "YES"), the transmitter section 202 transmits the result of authentication "Successful" to the terminal device 100 (Op. 28). If, on the other hand, the authentication is unsuccessful (if the query in Op. 27 is answered "NO"), the transmitter section 202 transmits the result of authentication "Unsuccessful" to the terminal device 100 (Op. 29). The authentication device 200 then terminates the authentication process.

As described above, the authentication system according to the first embodiment keeps a third party from performing spoofing even if the registration information leaks. The modification of the first embodiment ensures that the authentication device 200 does not handle the information for authentication and the authentication target information while they are not encrypted. Therefore, adequate security is provided for the information for authentication and the authentication target information. Further, the key information used by the terminal device 100 is different from the key information used by the authentication device 200. This ensures that the information for authentication and the authentication target information are kept secret from the authentication device 200.

Second Embodiment

Figure 9:
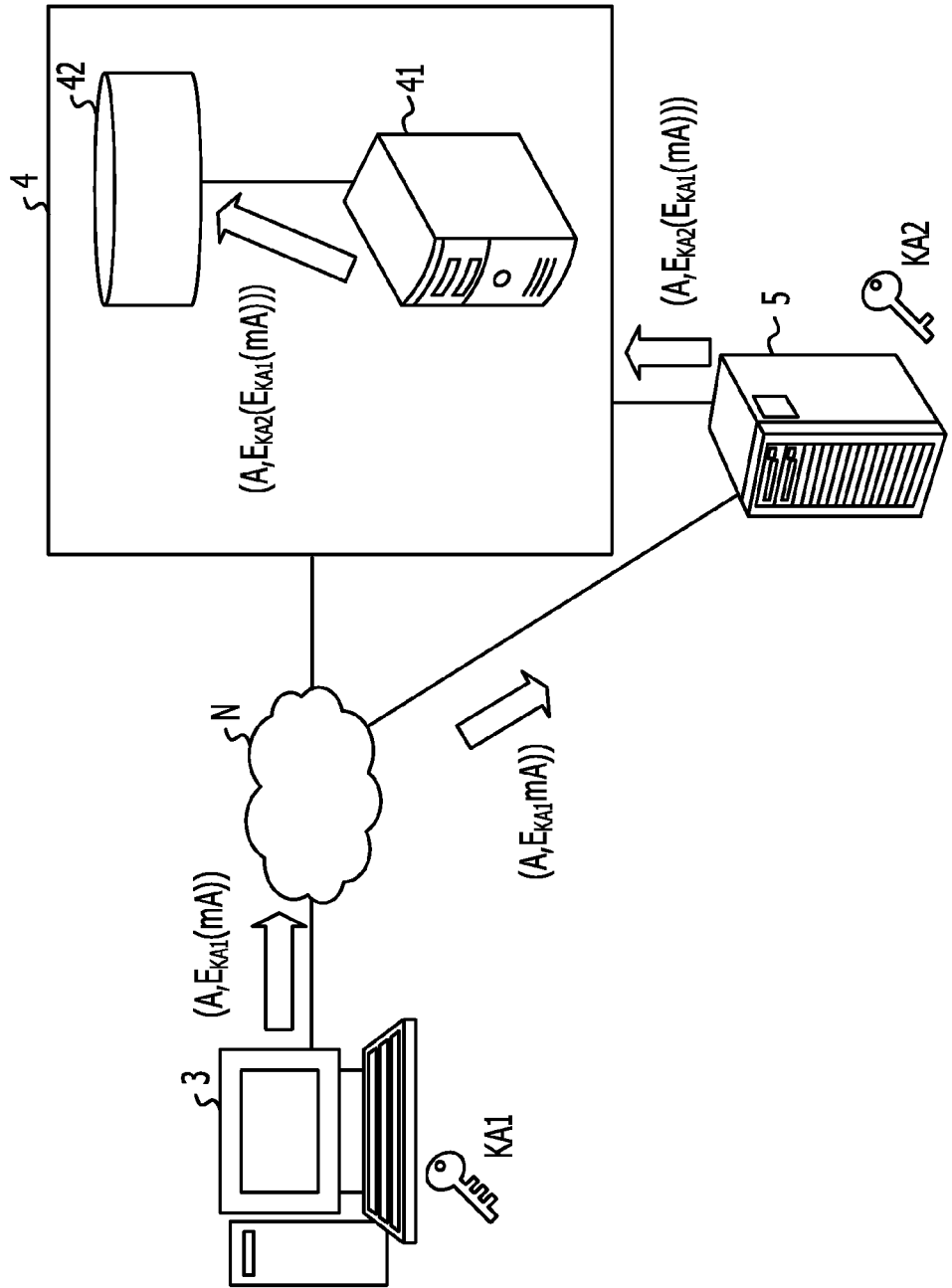
FIG. 9 is a diagram illustrating the registration process performed in the authentication system according to a second embodiment.

FIG. 9 is a diagram illustrating the registration process performed in the authentication system according to a second embodiment. The authentication system according to the second embodiment includes a terminal device 3, a management device 4, and a determination device 5. The terminal device 3, the management device 4, and the determination device 5 are connected through the network N. The management device 4 may be connected to the determination device 5 through a dedicated network. Alternatively, a plurality of units of the determination device 5 may be connected to one management device 4.

The terminal device 3 is a computer that requests the management device 4 to perform authentication. The terminal device 3 manages user-specific key information KA1, as is the case with the modification of the first embodiment. The management device 4 is a computer that manages the registration information. In other words, the management device 4 stores the registration information. The management device 4 includes a server 41 and a database 42. The server 41 performs processing. The database 42 stores the registration information.

The determination device 5 is a computer that determines whether or not the authentication is successful. The determination device 5 manages the key information "KA2" and performs authentication in accordance with the result of comparison between the registration information and the input information and with the key information "KA2". As is the case with the first embodiment, the key information "KA1" and the key information "KA2" are different items of key information and associated with the user ID "A".

In the registration process according to the second embodiment, the terminal device 3 accepts the input of the user ID "A" and the input of the information for authentication "mA". The terminal device 3 then generates the authentication information "$E_{KA1}(mA)$" by encrypting the information for authentication "mA" with the key information "KA1" associated with the user ID "A". Next, the terminal device 3 transmits the user ID "A" and the authentication information "$E_{KA1}(mA)$" to the determination device 5.

Subsequently, the determination device 5 receives the user ID "A" and the authentication information "$E_{KA1}(mA)$". The determination device 5 then generates the registration information "$E_{KA2}(E_{KA1}(mA))$" by encrypting the authentication information "$E_{KA1}(mA)$" with the key information "KA2". Next, the determination device 5 transmits the user ID "A" and the registration information "$E_{KA2}(E_{KA1}(mA))$" to the management device 4.

The management device 4 receives the user ID "A" and the registration information "$E_{KA2}(E_{KA1}(mA))$" from the determination device 5 and stores them in the database 42 in association with each other.

Figure 10:
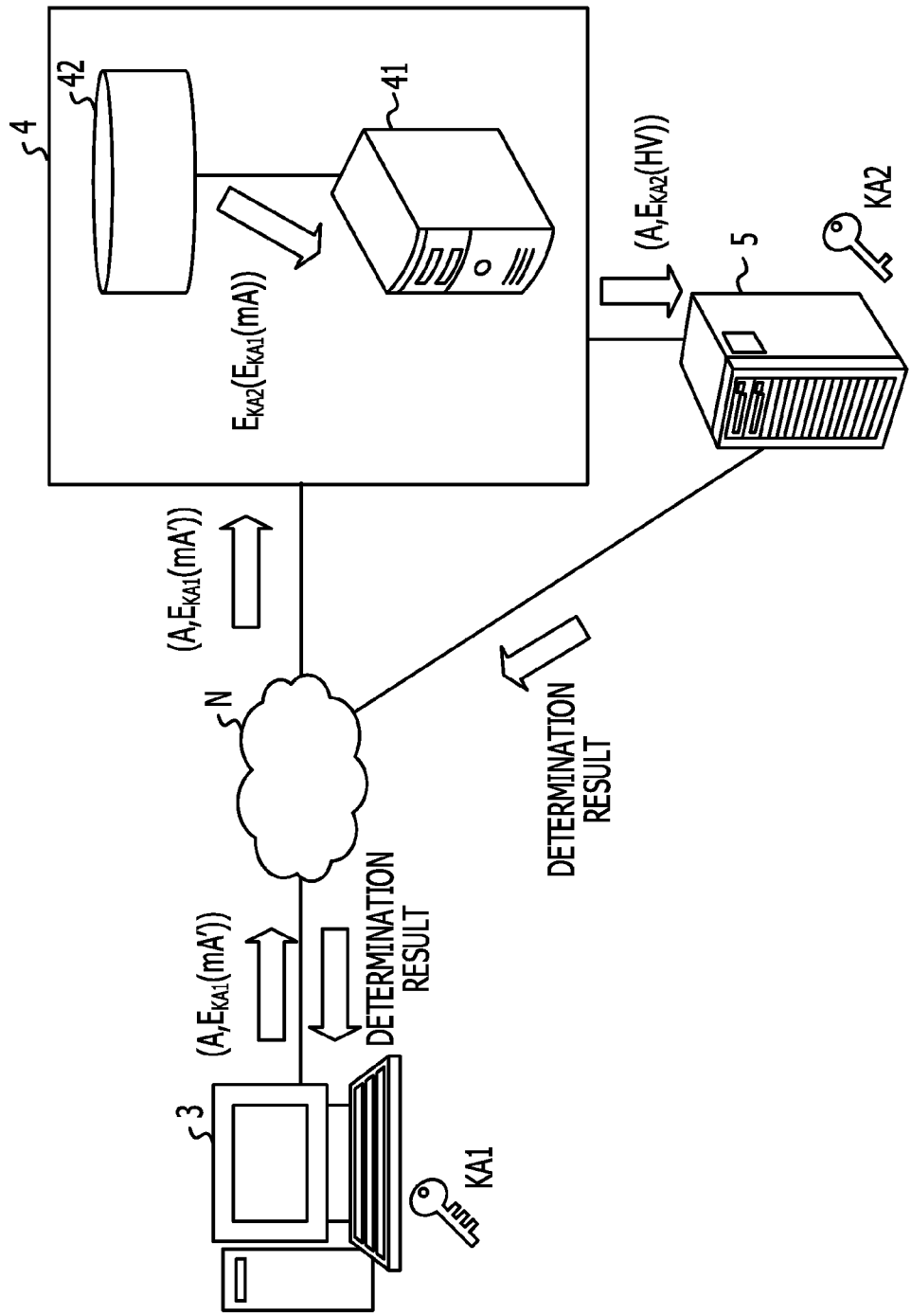
FIG. 10 is a diagram illustrating the authentication process performed in the authentication system according to the second embodiment.

FIG. 10 is a diagram illustrating the authentication process performed in the authentication system according to the second embodiment. The terminal device 3 accepts the input of the user ID "A" of the user to be authenticated and the input of the authentication target information "mA'". The terminal device 3 generates the input information "$E_{KA1}(mA')$" by encrypting the authentication target information "mA'" with the key information "KA1" associated with the user ID "A". The terminal device 3 then transmits the user ID "A" and the input information "$E_{KA1}(mA')$" to the management device 4.

Upon receipt of the user ID "A" and the input information "$E_{KA1}(mA')$", the management device 4 reads the registration information "$E_{KA2}(E_{KA1}(mA))$" associated with the user ID "A" and computes the result of comparison between the input information "$E_{KA1}(mA')$" and the registration information "$E_{KA2}(E_{KA1}(mA))$". In the present embodiment, the result of comparison "$E_{KA2}(HV)$" is obtained by computing the exclusive OR of the input information "$E_{KA1}(mA')$" and the registration information "$E_{KA2}(E_{KA1}(mA))$". The symbol "HV" denotes a hamming vector that is the exclusive OR of the information for authentication "mA" and the authentication target information "mA'". In other words, the comparison result "$E_{KA2}(HV)$" corresponds to information obtained by encrypting the hamming vector of the information for authentication and the authentication target information with the key information "KA2".

Next, the management device 4 transmits the user ID "A" and the comparison result "$E_{KA2}(HV)$" to the determination device 5. The determination device 5 performs authentication by using the comparison result "$E_{KA2}(HV)$" and the key information "KA2" associated with the user ID "A". For example, the determination device 5 acquires the hamming vector by decrypting the comparison result "$E_{KA2}(HV)$" with the key information "KA2". The determination device 5 then compares the number of hamming vector bits indicative of "1" against the threshold value "T" to determine whether or not the authentication is successful. The determination device 5 transmits the result of authentication to the terminal device 3.

As described above, the management device 4 has the functions of the computation section 205 and storage section 207 according to the first embodiment. Further, the determination device 5 has the functions of the encryption section 204 and authentication section 206 according to the first embodiment. In the second embodiment, therefore, the terminal device 3 communicates with the determination device 5 during the registration process and communicates with the management device 4 during the authentication process. In some cases, the management device 4 and the determination device 5 may be collectively referred to as the authentication device, as is the case with the first embodiment.

Further, in the second embodiment, the management device 4, which manages the registration information, is separate from the determination device 5, which manages the key information. In other words, the registration information and the key information are separately managed by different devices to reduce the risk of simultaneous leakage of the registration information and key information. Therefore, the second embodiment provides an improved capability of avoiding spoofing based on leaked registration information.

Figure 11:
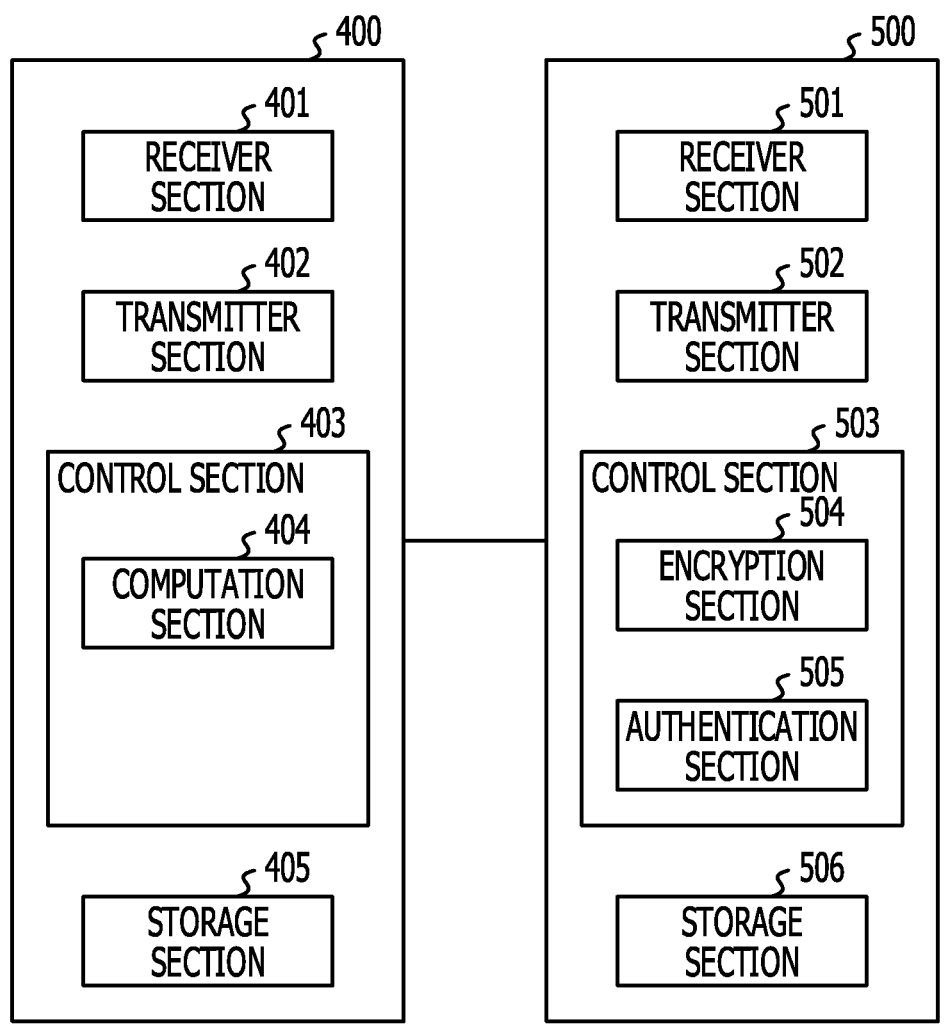
FIG. 11 is a functional block diagram illustrating a management device and determination device according to the second embodiment.

The functional configurations of the management device and determination device according to the second embodiment will now be described. FIG. 11 is a functional block diagram illustrating the management device and determination device according to the second embodiment. A management device 400 depicted in FIG. 11 corresponds to the management device 4 depicted in FIGS. 9 and 10. A determination device 500 depicted in FIG. 11 corresponds to the determination device 5 depicted in FIGS. 9 and 10.

The terminal device 3 has the same functional configuration as the terminal device 100 depicted in FIG. 5. However, the registration request handled in the registration process is transmitted to the determination device 500 under the control of the control section 104. Further, the authentication request handled in the authentication process is transmitted to the management device 400 under the control of the control section 104.

The management device 400 includes a receiver section 401, a transmitter section 402, a control section 403, and a storage section 405. The receiver section 401 receives information from the terminal device 3 or from the determination device 500. For example, the receiver section 401 receives the registration information from the determination device 500. The registration information is generated by the determination device 500. Further, the receiver section 401 receives an authentication request from the terminal device 3.

The transmitter section 402 transmits information to the determination device 500. For example, the transmitter section 402 transmits the result of comparison between the input information and the registration information to the determination device 500.

The control section 403 is a processing section that controls the operation of the management device 400. For example, the control section 403 performs the registration process and the authentication process. In the registration process, for example, the control section 403 causes the storage section 405 to store the registration information received from the determination device 500 in association with a user ID. The control section 403 includes a computation section 404.

The computation section 404 is a processing section that computes the result of comparison between the input information and the registration information. For example, the computation section 404 computes the exclusive OR of the input information included in the authentication request and the registration information acquired from the storage section 405. The transmitter section 402 transmits the result of comparison to the determination device 500.

The storage section 405 stores information that is to be used in the registration process and authentication process. For example, the storage section 405 stores the registration information "$E_{KA2}(E_{KA1}(mA))$" in association with the user ID "A". For example, the storage section 405 retains the registration information management table depicted in FIG. 6.

The determination device 500 includes a receiver section 501, a transmitter section 502, a control section 503, and a storage section 506. The receiver section 501 receives information from the terminal device 3 or from the management device 400. For example, the receiver section 501 receives a registration request from the terminal device 3. Further, the receiver section 501 receives the result of comparison between the input information and the registration information from the management device 400.

The transmitter section 502 transmits information to the terminal device 3 or to the management device 400. For example, the transmitter section 502 transmits the registration information to the management device 400. Further, the transmitter section 502 transmits the result of authentication to the terminal device 3.

The control section 503 is a processing section that controls the operation of the determination device 500. For example, the control section 503 performs the registration process and the authentication process. The control section 503 includes an encryption section 504 and an authentication section 505.

The encryption section 504 is a processing section that performs an encryption process. For example, the encryption section 504 encrypts the authentication information in the registration process to generate the registration information. User-specific key information is used for encryption.

The authentication section 505 is a processing section that performs authentication in accordance with the result of comparison and with the key information. For example, the authentication section 505 acquires the hamming vector of the information for authentication and the authentication target information by decrypting the comparison result with the key information. The authentication section 505 then generates the result of authentication by comparing the number of hamming vector bits indicative of "1" against the threshold value "T".

The storage section 506 stores information that is to be used in the registration process and authentication process. For example, the storage section 506 may store the key information "KA2" in association with the user ID "A".

Figure 12:
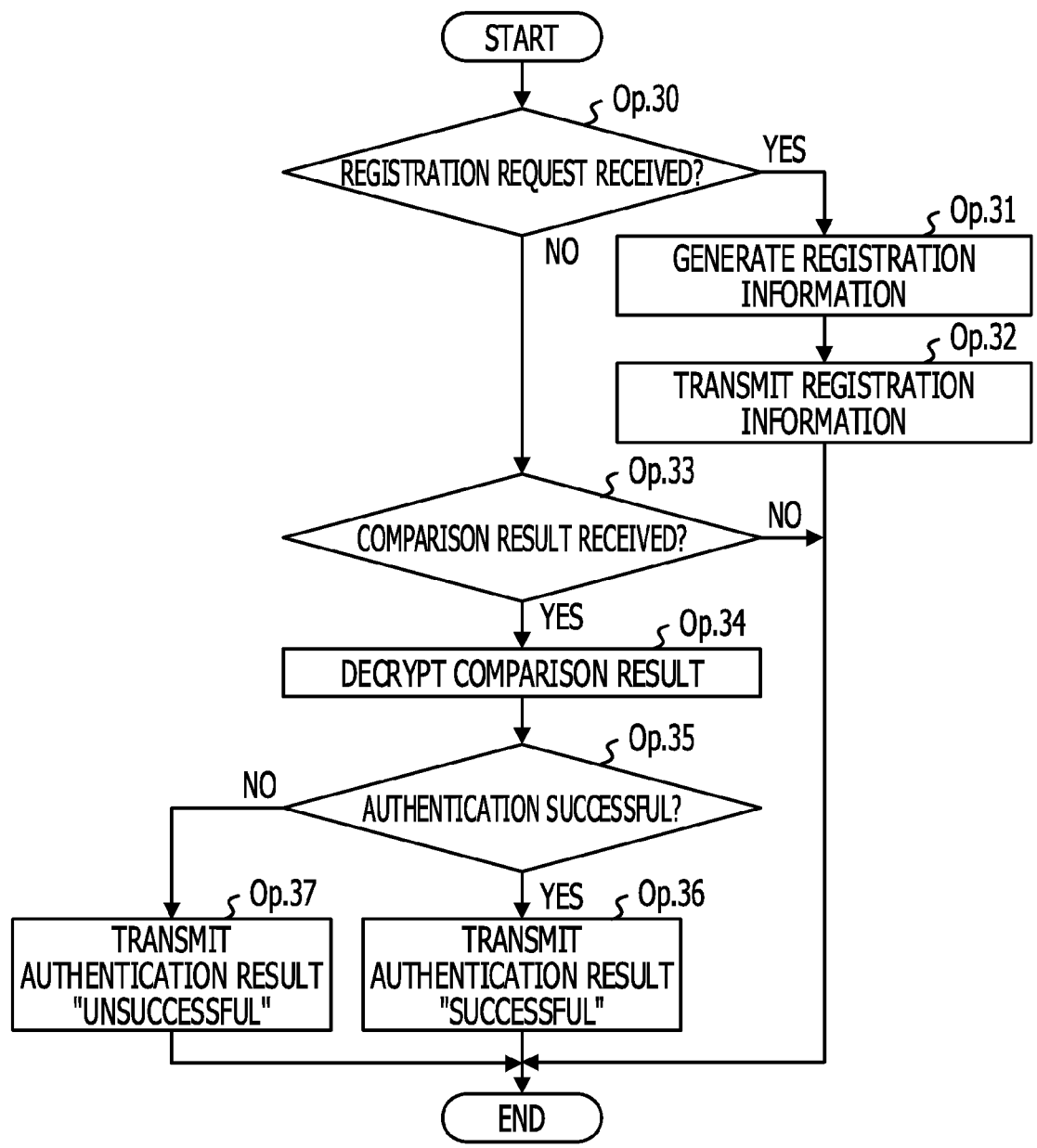
FIG. 12 is a flowchart illustrating a process performed by the determination device according to the second embodiment.

Processes performed by the devices according to the second embodiment will now be described. The process performed by the terminal device 3 is the same as described in conjunction with the first embodiment. FIG. 12 is a flowchart illustrating the process performed by the determination device according to the second embodiment.

The control section 503 determines whether or not a registration request is received from the terminal device 3 (Op. 30). This determination is based, for instance, on whether flag information indicative of the registration request is included in the information received by the receiver section 501.

If the registration request is received (if the query in Op. 30 is answered "YES"), the encryption section 504 generates registration information (Op. 31). For example, the encryption section 504 acquires a user ID included in the registration request and acquires the key information associated with the user ID from the storage section 506. The encryption section 504 then encrypts the authentication information included in the registration request by using the key information.

The transmitter section 502 transmits the registration information, which is associated with the user ID, to the management device 400 (Op. 32). The determination device 500 then terminates the registration process.

If, on the other hand, the registration request is not received (if the query in Op. 30 is answered "NO"), the control section 503 determines whether or not the result of comparison between the input information and the registration information is received from the management device 400 (Op. 33). This determination is based, for instance, on whether flag information indicative of the comparison result is included in the information received by the receiver section 501.

If the comparison result is not received (if the query in Op. 33 is answered "NO"), processing comes to an end. If, on the other hand, the comparison result is received (if the query in Op. 33 is answered "YES"), the authentication section 505 decrypts the comparison result (Op. 34) with the key information used to generate the registration information (Op. 31). In accordance with the result of decryption and with the threshold value "T", the authentication section 505 determines whether or not the authentication is successful (Op. 35).

If the authentication is successful (if the query in Op. 35 is answered "YES"), the transmitter section 502 transmits the result of authentication "Successful" to the terminal device 3 (Op. 36). If, on the other hand, the authentication is unsuccessful (if the query in Op. 35 is answered "NO"), the transmitter section 502 transmits the result of authentication "Unsuccessful" to the terminal device 3 (Op. 37). The determination device 500 then terminates the authentication process.

Figure 13:
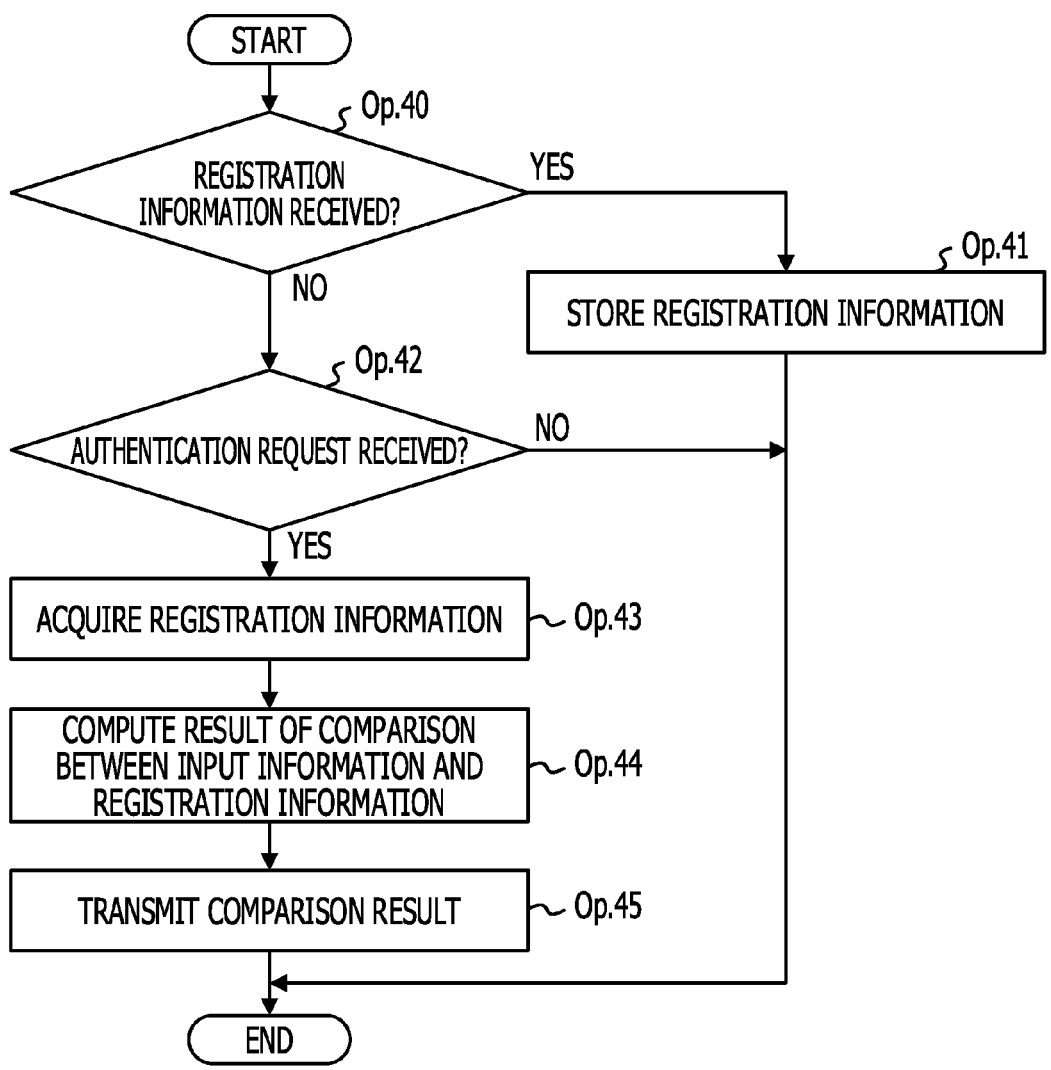
FIG. 13 is a flowchart illustrating a process performed by the management device according to the second embodiment.

FIG. 13 is a flowchart illustrating a process performed by the management device according to the second embodiment.

First of all, the control section 403 determines whether or not the registration information is received from the determination device 500 (Op. 40). This determination is based, for instance, on whether flag information indicative of the registration information is included in the information received by the receiver section 401.

If the registration information is received (if the query in Op. 40 is answered "YES"), the control section 403 causes the storage section 405 to store the registration information and a user ID in association with each other (Op. 41). The management device 400 then terminates the authentication process.

If, on the other hand, the registration information is not received (if the query in Op. 40 is answered "NO"), the control section 403 determines whether or not the authentication request is received from the terminal device 3 (Op. 42). This determination is based, for instance, on whether flag information indicative of the authentication request is included in the information received by the receiver section 401.

If the authentication request is not received (if the query in Op. 42 is answered "NO"), processing comes to an end. If, on the other hand, the authentication request is received (if the query in Op. 42 is answered "YES"), the computation section 404 acquires the registration information associated with a user ID included in the authentication request from the storage section 405 (Op. 43).

Subsequently, the computation section 404 computes the result of comparison between the input information included in the authentication request and the registration information (Op. 44). For example, the computation section 404 computes the exclusive OR of the input information and the registration information. The result of computation corresponds to information obtained by encrypting the hamming vector of the information for authentication and the authentication target information with the key information used to generate the registration information in the determination device 500 (Op. 31).

Next, the transmitter section 402 transmits the comparison result and the user ID to the determination device 500 (Op. 45). The management device 400 then terminates the authentication process.

As described above, the second embodiment makes it possible to keep a third party from performing spoofing by using leaked registration information. Further, as the second embodiment causes the management device 400 to manage the registration information and the determination device 500 to manage the key information, it is possible to avoid spoofing with increased certainty.

Third Embodiment

The second embodiment and the modification of the first embodiment have been described on the assumption that when, for instance, the registration is to be performed in relation to the user ID "A", the terminal device performs encryption with the key information KA1 while the authentication device 200 or the determination device 500 performs encryption with the key information "KA2". In other words, in the second embodiment and the modification of the first embodiment, the registration information is the information for authentication that is doubly encrypted with two different pieces of key information.

The registration information used in a third embodiment is the information for authentication that is encrypted M times, namely, three or more times. As different devices manage M or more pieces of key information as described subsequently, it is possible to reduce the risk of the registration information and key information being simultaneously stolen. An example in which the value M is "3" will now be described.

Figure 14:
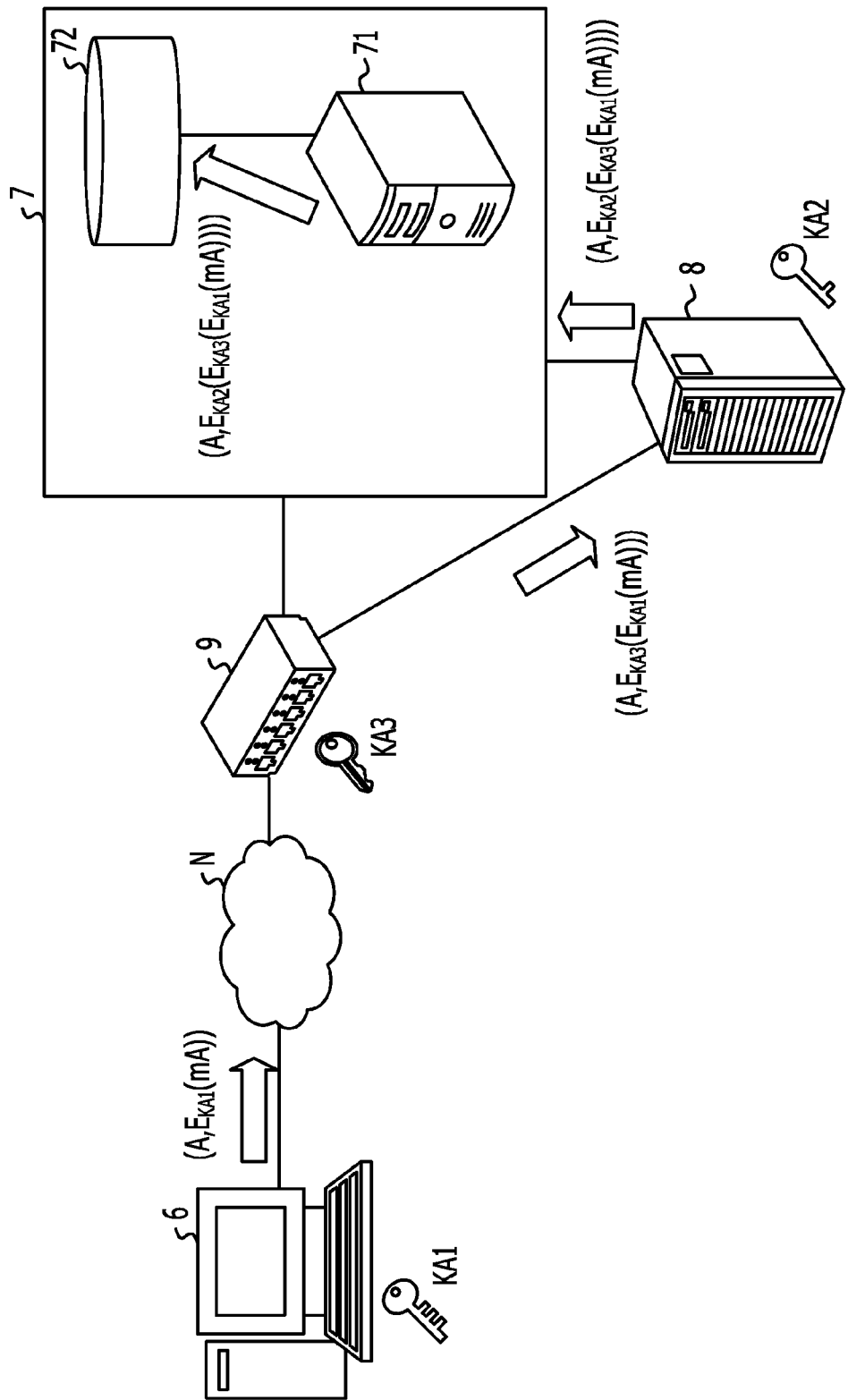
FIG. 14 is a diagram illustrating the registration process performed in the authentication system according to a third embodiment.

FIG. 14 is a diagram illustrating the registration process performed in the authentication system according to the third embodiment. The authentication system according to the third embodiment includes a terminal device 6, a management device 7, a determination device 8, and a relay device 9. The terminal device 6, the management device 7, the determination device 8, and the relay device 9 are connected through the network N. The management device 7, the determination device 8, and the relay device 9 may be connected with a dedicated network. In some cases, the management device 7, the determination device 8, and the relay device 9 may be collectively referred to as the authentication device, as is the case with the first embodiment.

The terminal device 6 is a computer that requests the management device 4 through the relay device 9 to perform authentication. The terminal device 6 manages user-specific key information "KA1", as is the case with the second embodiment and the modification of the first embodiment. The management device 7 is a computer that manages the registration information, as is the case with the second embodiment. In other words, the management device 7 stores the registration information. The management device 7 includes a server 71 and a database 72.

The determination device 8 is a computer that determines whether or not the authentication is successful. More specifically, the determination 8 manages the key information "KA2" and performs authentication in accordance with the result of comparison between the registration information and the input information and with the key information "KA2". The key information "KA1" and the key information "KA2" are different items of key information.

The relay device 9 is a computer that relays the communication between the terminal device 6 and the management device 7 or the determination device 8. Further, the relay device 9 manages key information "KA3". The key information "KA3" is associated with the user ID "A" and varies from one user to another. The key information "KA3" is different from the key information "KA1" and the key information "KA2". In the registration process and authentication process, the relay device 9 encrypts information received from the terminal device 6 with the key information "KA3", which is managed by the relay device 9.

In the registration process according to the third embodiment, first of all, the terminal device 6 accepts the input of the user ID "A" and the input of the information for authentication "mA". The terminal device 6 then generates first authentication information "$E_{KA1}(mA)$" by encrypting the information for authentication "mA" with the key information "KA1" associated with the user ID "A". Next, the terminal device 6 transmits the user ID "A" and the first authentication information "$E_{KA1}(mA)$" to the relay device 9.

The relay device 9 then receives the user ID "A" and the first authentication information "$E_{KA1}(mA)$". Next, the relay device 9 generates second authentication information "$E_{KA3}(E_{KA1}(mA))$" by encrypting the first authentication information "$E_{KA1}(mA)$" with the key information "KA3". The relay device 9 then transmits the user ID "A" and the second authentication information "$E_{KA3}(E_{KA1}(mA))$" to the determination device 8.

The determination device 8 receives the user ID "A" and the second authentication information "$E_{KA3}(E_{KA1}(mA))$". The determination device 8 then generates registration information "$E_{KA2}(E_{KA3}(E_{KA1}(mA)))$" by encrypting the second authentication information "$E_{KA3}(E_{KA1}(mA))$" with the key information "KA2". Next, the determination device 8 transmits the user ID "A" and the registration information "$E_{KA2}(E_{KA3}(E_{KA1}(mA)))$" to the management device 7.

The management device 7 receives the user ID "A" and the registration information "$E_{KA2}(E_{KA3}(E_{KA1}(mA)))$" from the determination device 8 and stores them in the database 72 in association with each other.

The first authentication information is obtained when the information for authentication is encrypted by the terminal device 6. The second authentication information is obtained when the first authentication information is encrypted by the relay device 9. The registration information is obtained when the second authentication information is encrypted by the determination device 8 and is stored by the management device 7 for the authentication process, as is the case with the foregoing embodiments.

Figure 15:
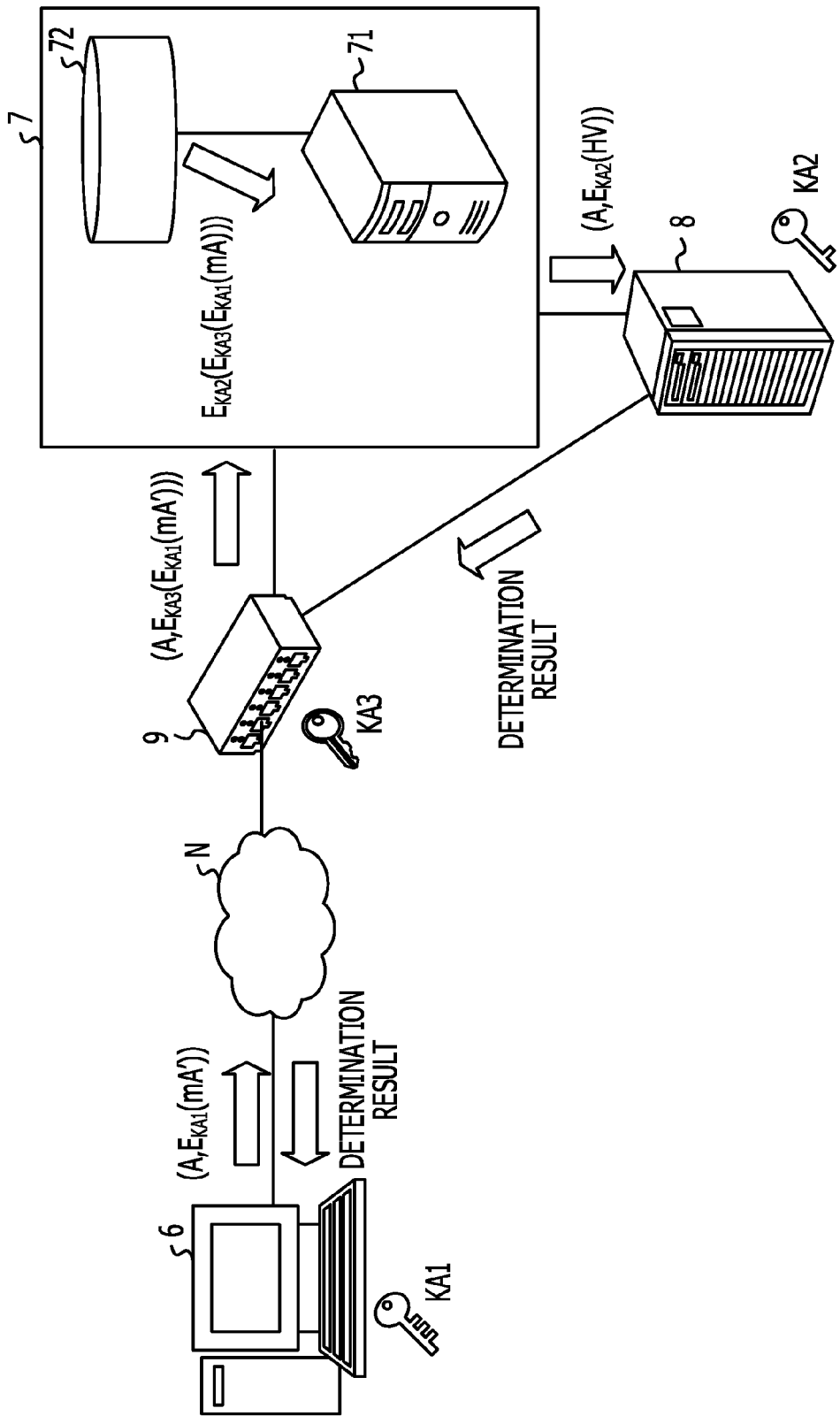
FIG. 15 is a diagram illustrating the authentication process performed in the authentication system according to the third embodiment.

FIG. 15 is a diagram illustrating the authentication process performed in the authentication system according to the third embodiment. The terminal device 6 accepts the input of the user ID "A" of the user to be authenticated and the input of the authentication target information "mA'". The terminal device 6 then generates first input information "$E_{KA1}(mA')$" by encrypting the authentication target information "mA'" with the key information "KA1" associated with the user ID "A". Next, the terminal device 6 transmits the user ID "A" and the first input information "$E_{KA1}(mA')$" to the relay device 9.

The relay device 9 receives the user ID "A" and the first input information "$E_{KA1}(mA')$". The terminal device 6 generates second input information "$E_{KA3}(E_{KA1}(mA'))$" by encrypting the first input information "$E_{KA1}(mA')$" with the key information "KA3" associated with the user ID "A". The terminal device 6 then transmits the user ID "A" and the second input information "$E_{KA3}(E_{KA1}(mA'))$" to the management device 7.

The management device 7 reads the registration information "$E_{KA2}(E_{KA3}(E_{KA1}(mA)))$" associated with the user ID "A" and computes the result of comparison "$E_{KA2}(HV)$" between the second input information "$E_{KA3}(E_{KA1}(mA'))$" and the registration information "$E_{KA2}(E_{KA3}(E_{KA1}(mA)))$". For example, the management device 7 computes the exclusive OR of the second input information "$E_{KA3}(E_{KA1}(mA'))$" and the registration information "$E_{KA2}(E_{KA3}(E_{KA1}(mA)))$". The result of computation corresponds to information obtained when the hamming vector HV, which is the exclusive OR of the information for authentication "mA" and the authentication target information "mA'", is encrypted with the key information "KA2".

The management device 7 then transmits the user ID "A" and the comparison result "$E_{KA2}(HV)$" to the determination device 8. The determination device 8 performs authentication by using the comparison result "$E_{KA2}(HV)$" and the key information "KA2" associated with the user ID "A". The determination device 8 then transmits the result of authentication to the terminal device 6. The authentication result may be transmitted to the terminal device 6 through the relay device 9 or directly transmitted to the terminal device 6.

The first input information is obtained when the authentication target information is encrypted by the terminal device 6. The second input information is obtained when the first input information is encrypted by the relay device 9. The comparison result is the result of comparison between the second input information and the registration information. As is the case with the foregoing embodiments, the comparison result corresponds to information that is obtained when the information indicative of the degree of similarity between the information for authentication and the authentication target information is encrypted with the key information managed by the determination device 8.

As described above, the terminal device 6 communicates with the determination device 8 or the management device 7 through the relay device 9. As the relay device 9 performs encryption in the registration process by using the key information managed by the relay device 9, the registration information finally registered in the management device 7 is encrypted three times. Therefore, as is the case with the foregoing embodiments, the third embodiment keeps a third party from performing spoofing when the registration information leaks. Further, as the third embodiment additionally includes a device that manages the key information, it makes it possible to further reduce the risk of spoofing being performed in the event of key information leakage.

Figure 16:
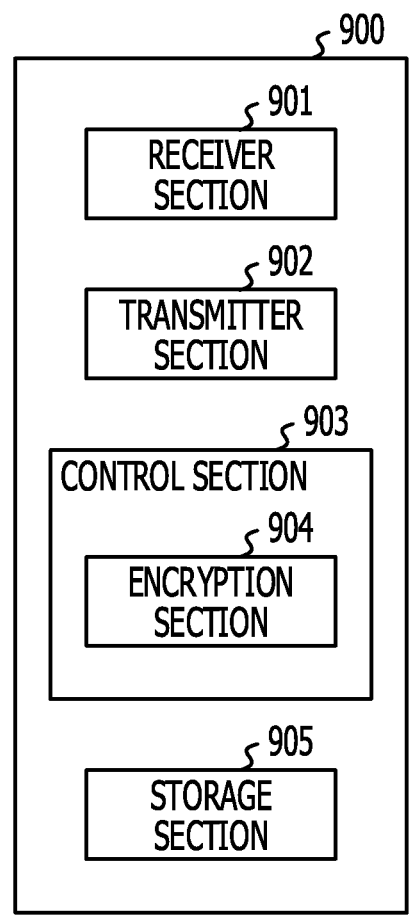
FIG. 16 is a functional block diagram illustrating a relay device according to the third embodiment.

The functional configuration of the relay device 9 will now be described. FIG. 16 is a functional block diagram illustrating the relay device according to the third embodiment. A relay device 900 depicted in FIG. 16 corresponds to the relay device 9 depicted in FIGS. 14 and 15. The terminal device 6, the management device 7, and the determination device 8 have the same configuration as those used in the second embodiment. However, as described with reference to FIGS. 14 and 15, the devices with which the receiver and transmitter sections of each device communicate are different from those in the second embodiment.

The relay device 900 includes a receiver section 901, a transmitter section 902, a control section 903, and a storage section 905. The receiver section 901 is a processing section that receives information from the terminal device 6. For example, the receiver section 901 receives a first registration request and a first authentication request from the terminal device 6. The first registration request is information that is generated in the registration process by the terminal device 6 and includes the user ID of the user to be registered and the first authentication information. The first authentication request is information that is generated in the authentication process by the terminal device 6 and includes the user ID of the user to be authenticated and the first input information.

The transmitter section 902 is a processing section that transmits information to the management device 7 and the determination device 8. For example, the transmitter section 902 transmits a second registration request to the determination device 8. Further, the transmitter section 902 transmits a second authentication request to the management device 7. The second registration request is information that is generated when the relay device 9 receives the first registration request from the terminal device 6 and includes the user ID of the user to be registered and the second authentication information. The second authentication request is information that is generated when the relay device 9 receives the first authentication request from the terminal device 6 and includes the user ID of the user to be authenticated and the second input information.

The control section 903 is a processing section that controls the operation of the relay device 900. For example, the control section 903 performs the registration process and the authentication process. The control section 903 includes an encryption section 904.

The encryption section 904 is a processing section that performs an encryption process. For example, the encryption section 904 encrypts the first authentication information in the registration process to generate the second authentication information. Further, the encryption section 904 encrypts the first input information in the authentication process to generate the second input information. User-specific key information is used for encryption. As is the case with the foregoing embodiments, the user-specific key information may be stored in advance in the storage section 905 or generated as occasion calls.

The storage section 905 stores information that is to be used in the registration process and authentication process. For example, the storage section 905 may store the key information "KA3" in association with the user ID "$_A$".

Figure 17:
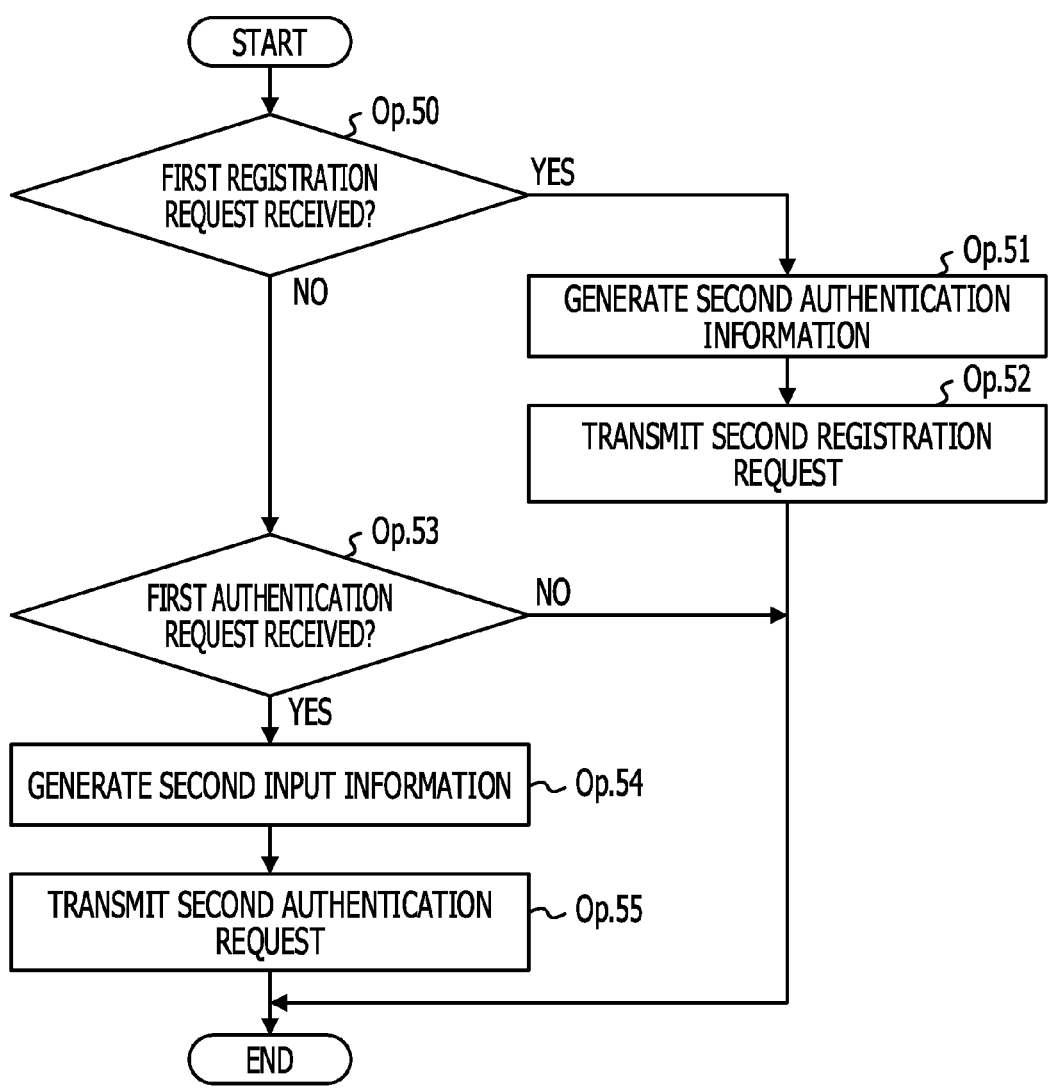
FIG. 17 is a flowchart illustrating a process performed by the relay device according to the third embodiment.

The process performed by the relay device 900 according to the third embodiment will now be described. The processes performed by the terminal device 6, the management device 7, and the determination device 8 are the same as those described in conjunction with the second embodiment. However, as described with reference to FIGS. 14 and 15, the devices with which the receiver and transmitter sections of each device communicate are different from those in the second embodiment, as is the case with the functional configuration. FIG. 17 is a flowchart illustrating the process performed by the relay device according to the third embodiment.

First of all, the control section 903 determines whether or not the first registration request is received from the terminal device 6 (Op. 50). This determination is based, for instance, on whether flag information indicative of the first registration request is included in the information received by the receiver section 901.

If the first registration request is received (if the query in Op. 50 is answered "YES"), the encryption section 904 generates the second authentication information (Op. 51). For example, the encryption section 904 acquires a user ID included in the first registration request and acquires the key information associated with the user ID from the storage section 905. Next, the encryption section 904 encrypts the first authentication information included in the first registration request with the key information.

The transmitter section 902 transmits the second authentication information, which is associated with the user ID, to the determination device 8 (Op. 52). The relay device 900 then terminates the registration process.

If, on the other hand, the first registration request is not received (if the query in Op. 50 is answered "NO"), the control section 903 determines whether or not the first authentication request is received (Op. 53). This determination is based, for instance, on whether flag information indicative of the first authentication request is included in the information received by the receiver section 901.

If the first authentication request is not received (if the query in Op. 53 is answered "NO"), the relay device 900 terminates the process. If, on the other hand, the first authentication request is received (if the query in Op. 53 is answered "YES"), the encryption section 904 generates the second input information (Op. 54). For example, the encryption section 904 acquires a user ID included in the first authentication request and acquires the key information associated with the user ID from the storage section 905. Next, the encryption section 904 encrypts the first input information included in the first authentication request with the key information.

The transmitter section 902 transmits the second authentication request, which is associated with the user ID, to the management device 7 (Op. 55). The relay device 900 then terminates the registration process.

As described above, the relay device 900 performs the encryption process during the registration process. Therefore, the registration information finally registered in the management device 7 is encrypted M times, that is, three or more times. As the key information used for encryption is managed by different devices during a process of registration information generation, it is possible to further reduce the risk of spoofing being performed. Further, as the relay device 900 also performs encryption during the authentication process, authentication is achieved in the same manner as described in conjunction with the foregoing embodiments by using the registration information that is encrypted M times.

Fourth Embodiment

In a fourth embodiment, the method of registering the registration information in the management device is different from those used in the foregoing embodiments. Although details will be described later, the terminal device generates the first information for authentication and the second information for authentication from the information for authentication. One of them is transmitted to the determination device while the other is transmitted to the management device. The management device then generates the registration information from the information it has received and the information acquired through the determination device.

Figure 18:
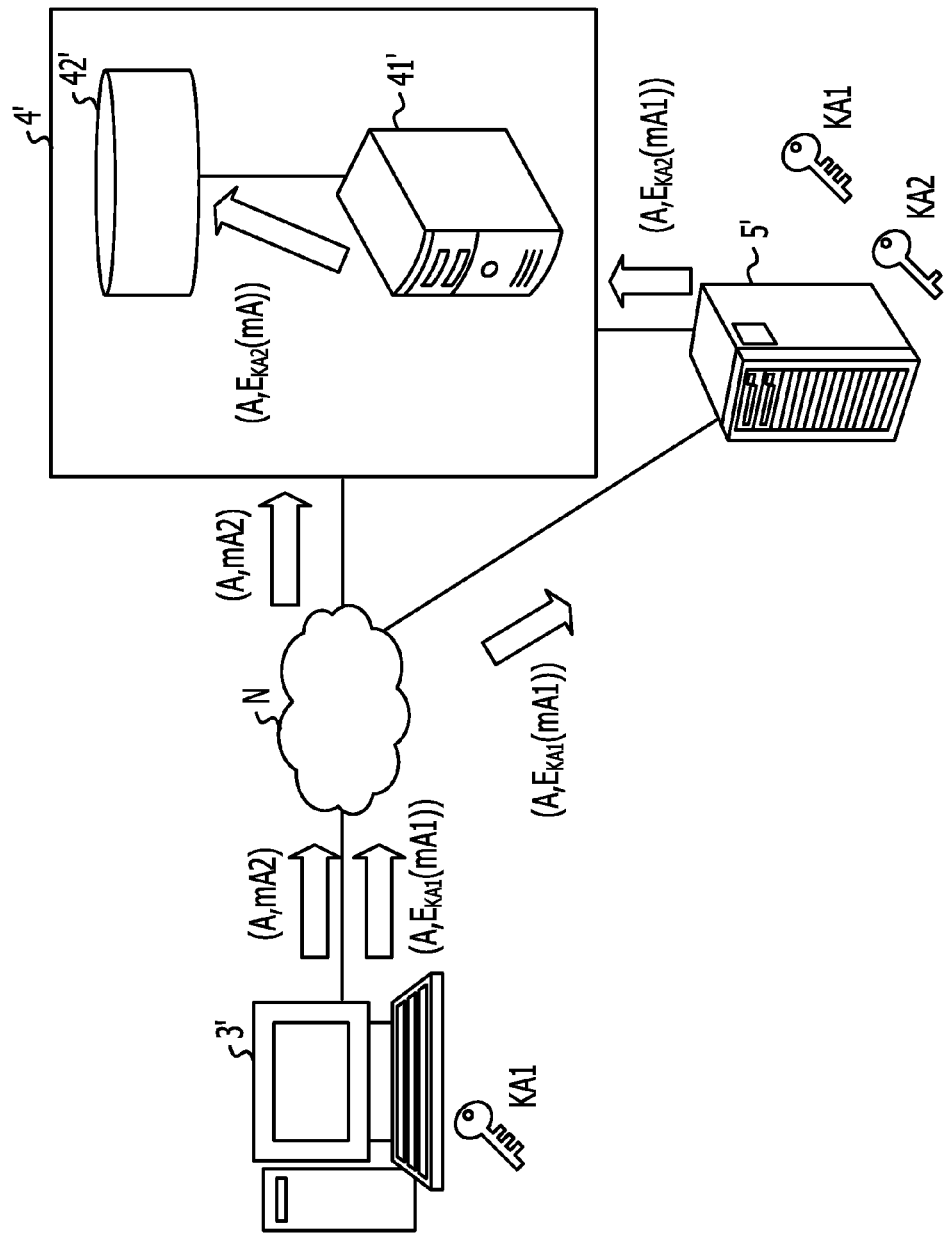
FIG. 18 is a diagram illustrating the registration process performed in the authentication system according to a fourth embodiment.

FIG. 18 is a diagram illustrating the registration process performed in the authentication system according to the fourth embodiment. The authentication system according to the fourth embodiment includes a terminal device 3', a management device 4', and a determination device 5'. The terminal device 3', the management device 4', and the determination device 5' are connected through the network N. The management device 4' and the determination device 5' may be connected with a dedicated network. In some cases, the management device 4' and the determination device 5' may be collectively referred to as the authentication device, as is the case with the first embodiment.

The terminal device 3' is a computer that requests the management device 4' to perform authentication. Further, the terminal device 3' manages the user-specific key information "KA1", as is the case with the second embodiment. The management device 4' is a computer that manages the registration information. In other words, the management device 4' stores the registration information. The management device 4' includes a server 41' and a database 42'. The server 41' performs processing. The database 42' stores the registration information.

The determination device 5' is a computer that determines whether or not the authentication is successful. The determination device 5' manages the key information "KA2", as is the case with the second embodiment, and also manages the key information "KA1", which is managed by the terminal device 3'. Further, the determination device 5' performs authentication in accordance with the result of comparison between the registration information and the input information. The key information "KA1" is different from the key information "KA2".

The determination device 5' may retain the result of computing the exclusive OR of the key information "KA1" and the key information "KA2" as the key information "KA3". Further, the determination device 5' may apply the key information "KA3" in a later-described process in which the key information "KA1" and the key information "KA2" are applied.

As the determination device 5' has the key information "KA1" as well, information encrypted by the terminal device 3' may be decrypted by the determination device 5'. Therefore, when the determination device 5' acquires information that is obtained by encrypting the information for authentication "mA" with the key information "KA1", the determination device 5' acquires the information for authentication "mA".

Hence, in the present embodiment, the terminal device 3' generates the first information for authentication in the registration process instead of the plain information for authentication "mA", and transmits the first information for authentication to the determination device 5'. In other words, the determination device 5' is unable to acquire the plain information for authentication "mA".

Details will now be described. In the registration process according to the present embodiment, the terminal device 3' accepts the input of the user ID "A" and the input of the information for authentication "mA". The terminal device 3' then generates the first information for authentication "mA1" and the second information for authentication "mA2". The terminal device 3' then generates the first information for authentication "mA1" and the second information for authentication "mA2" so that the exclusive OR of the first information for authentication "mA1" and the second information for authentication "mA2" is the information for authentication "mA".

For example, the terminal device 3' first generates a random number "m". The terminal device 3' then uses the random number "m" as the first information for authentication "mA1". Further, the terminal device 3' uses the exclusive OR of the first information for authentication "mA1" and the information for authentication "mA" as the second information for authentication "mA2". The second information for authentication "mA2" may be the random number "m". Further, the exclusive OR of the second information for authentication "mA2" and the information for authentication "mA" may be the first information for authentication "mA1".

The terminal device 3' generates partial authentication information "$E_{KA1}(mA1)$" by encrypting the first information for authentication "mA1" with the key information "KA1" associated with the user ID "A". The terminal device 3'then transmits the user ID "A" and the partial authentication information "$E_{KA1}(mA1)$" to the determination device 5'. The partial authentication information is transmitted from the terminal device 3' to the determination device 5' and obtained when the first information for authentication is encrypted with the key information "KA1", which is shared by the terminal device 3' and the determination device 5'.

Further, the terminal device 3' transmits the user ID "A" and the second information for authentication "mA2" to the management device 4'. It is preferred that a secure communication path be used for the communication between the terminal device 3' and the management device 4'. For example, it is preferred that the second information for authentication "mA2" be communicated after being encrypted with secure socket layer (SSL).

Next, the determination device 5' receives the user ID "A" and the partial authentication information "$E_{KA1}(mA1)$". The determination device 5' then converts the partial authentication information "$E_{KA1}(mA1)$" to partial registration information "$E_{KA2}(mA1)$" by using the key information "KA1" and the key information "KA2". In other words, an encryption provided by the key information "KA1" is converted to an encryption provided by the key information "KA2".

More specifically, the partial registration information "$E_{KA2}(mA1)$" is acquired by computing the exclusive OR of the partial authentication information "$E_{KA1}(mA1)$", the key information "KA1", and the key information "KA2". The partial registration information is transmitted from the determination device 5' to the management device 4' and acquired by encrypting the first information for authentication with the key information managed by the determination device 5'. The user ID "A" and the partial registration information "$E_{KA2}(mA1)$" are then transmitted to the management device 4'.

The management device 4' receives the user ID "A" and the second information for authentication "mA2" from the terminal device 3'. Further, the management device 4' receives the user ID "A" and the partial registration information "$E_{KA2}$ (mA1)" from the determination device 5'. The management device 4' generates the registration information "$E_{KA2}(\text{mA})$" by computing the exclusive OR of the second information for authentication "mA2" and the partial registration information "$E_{KA2}(\text{mA1})$".

The exclusive OR of the first information for authentication "mA1" and the second information for authentication "mA2" is the information for authentication "mA". Therefore, the result of computing the exclusive OR of the second information for authentication "mA2" and the partial registration information "$E_{KA2}(\text{mA1})$" corresponds to information obtained by encrypting the information for authentication "mA" with the key information "KA2". The management device 4' then stores the user ID "A" and the registration information "$E_{KA2}(\text{mA1})$" in the database 42' in association with each other.

Figure 19:
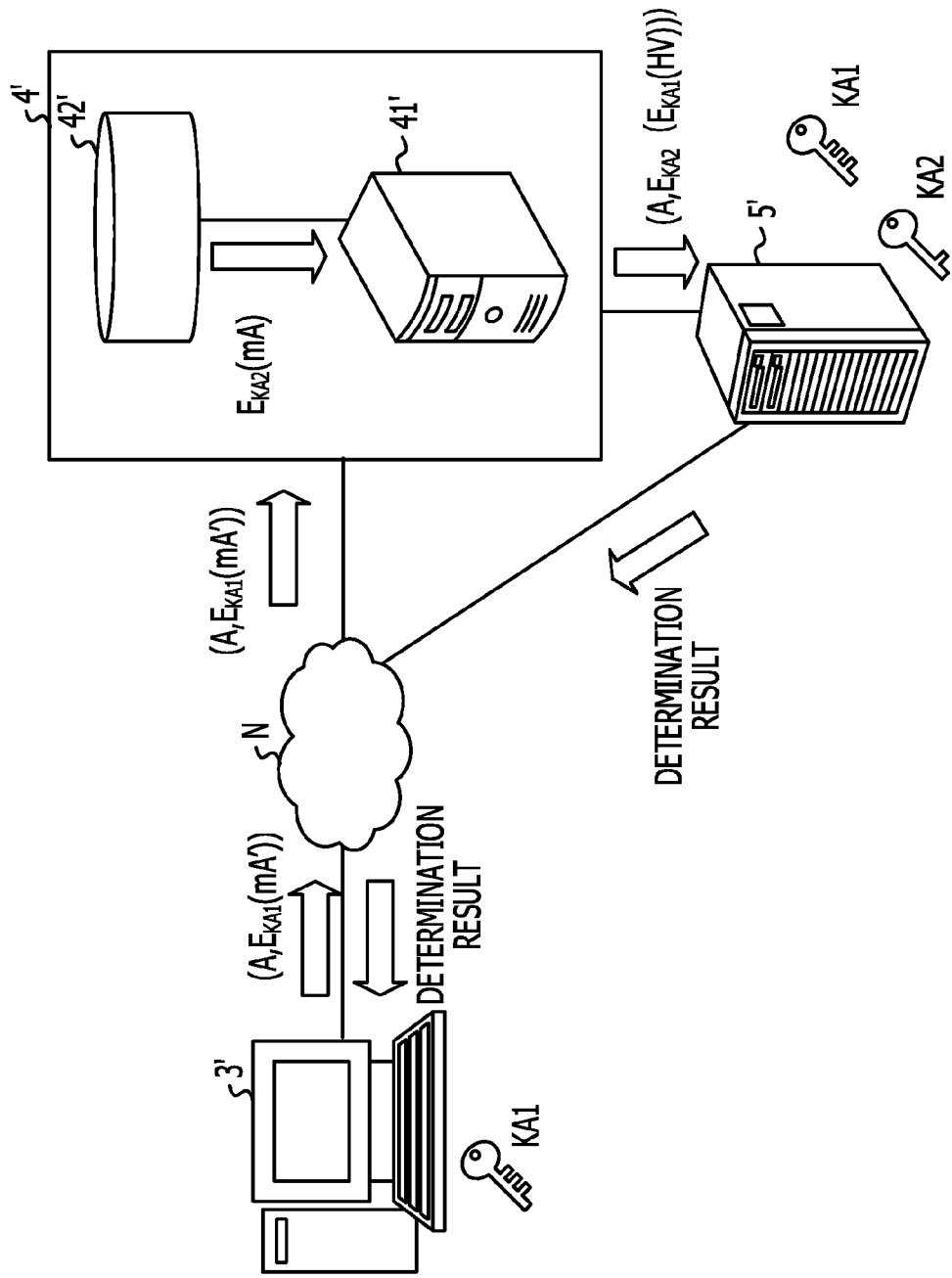
FIG. 19 is a diagram illustrating the authentication process performed in the authentication system according to the fourth embodiment.

FIG. 19 is a diagram illustrating the authentication process performed in the authentication system according to the fourth embodiment. The terminal device 3' accepts the input of the user ID "A" of the user to be authenticated and the input of the authentication target information "mA'". The terminal device 3' generates the input information "$E_{KA1}(\text{mA'})$" by encrypting the authentication target information "mA'" with the key information "KA1" associated with the user ID "A". The terminal device 3' then transmits the user ID "A" and the input information "$E_{KA1}(\text{mA'})$" to the management device 4'.

The management device 4' reads the registration information "$E_{KA2}(\text{mA})$" associated with the user ID "A" and computes the result of comparison "$E_{KA2}(E_{KA1}(\text{HV}))$" between the input information "$E_{KA1}(\text{mA'})$" and the registration information "$E_{KA2}(\text{mA})$". For example, the management device 4' computes the exclusive OR of the input information "$E_{KA1}(\text{mA'})$" and the registration information "$E_{KA2}(\text{mA})$". The result of computation corresponds to information obtained when the hamming vector HV, which is the result of computing the exclusive OR of the information for authentication and the authentication target information, is encrypted with the key information "KA1" and the key information "KA2".

The management device 4' transmits the user ID "A" and the comparison result "$E_{KA2}(E_{KA1}(\text{HV}))$" to the determination device 5'. The determination device 5' performs authentication by using the key information "KA1" and key information "KA2" associated with the user ID "A" and the comparison result "$E_{KA2}(E_{KA1}(\text{HV}))$". For example, the determination device 5' acquires the hamming vector HV by decrypting the comparison result "$E_{KA2}(E_{KA1}(\text{HV}))$" with the key information "KA1" and the key information "KA2". The determination device 5' then compares the number of hamming vector HV bits indicative of "1" against a threshold value to determine whether or not the authentication is successful. Next, the determination device 5' transmits the result of authentication to the terminal device 3'.

As described above, the management device 4' generates the registration information from the partial registration information and the second information for authentication. Therefore, while the plain information for authentication is not acquired by the determination device 5', another method of registering the registration information in the management device 4' is implemented.

The key information "KA1" and the key information "KA2" are generated in such a manner that the number of bits indicative of "1" in the exclusive OR of the key information "KA1" and the key information "KA2" is not smaller than the threshold value "T" for determining whether or not the authentication is successful.

When the registration information "$E_{KA2}(\text{mA})$" leaks, a third party transmits the registration information "$E_{KA2}(\text{mA})$" in the authentication process to the management device 4' as the input information. In this instance, the result of comparison "$E_{KA2}(E_{KA1}(\text{HV}))$" between the registration information "$E_{KA2}(\text{mA})$" and the input information "$E_{KA2}(\text{mA})$" is a data stream of 0s.

Before authentication in the present embodiment, the determination device 5' computes the exclusive OR of the comparison result "$E_{KA2}(E_{KA1}(\text{HV}))$", the key information "KA1", and the key information "KA2". Thus, it is demanded for the avoidance of spoofing that the number of bits indicative of "1" in the result of computation be not smaller than the threshold value "T". Therefore, the key information "KA1" and the key information "KA2" are generated beforehand so that the number of bits indicative of "1" in the exclusive OR of the key information "KA1" and the key information "KA2" is not smaller than the threshold value "T".

The functional configurations of the devices according to the fourth embodiment will now be described. The terminal device 3' has the same functional configuration as the terminal device 100 depicted in FIG. 5. However, the control section 104 of the terminal device 3' generates the first information for authentication and the second information for authentication.

The management device 4' has the same functional configuration as the management device 400 depicted in FIG. 11. However, the control section 403 generates the registration information in accordance with the partial registration information and the second information for authentication.

The determination device 5' has the same functional configuration as the determination device 500 depicted in FIG. 11. However, the encryption section 504 generates the partial registration information in the registration process by applying the key information "KA1" and the key information "KA2" to the first information for authentication. The authentication section 505 performs authentication in the authentication process by using the key information "KA1" and the key information "KA2".

Figure 20:
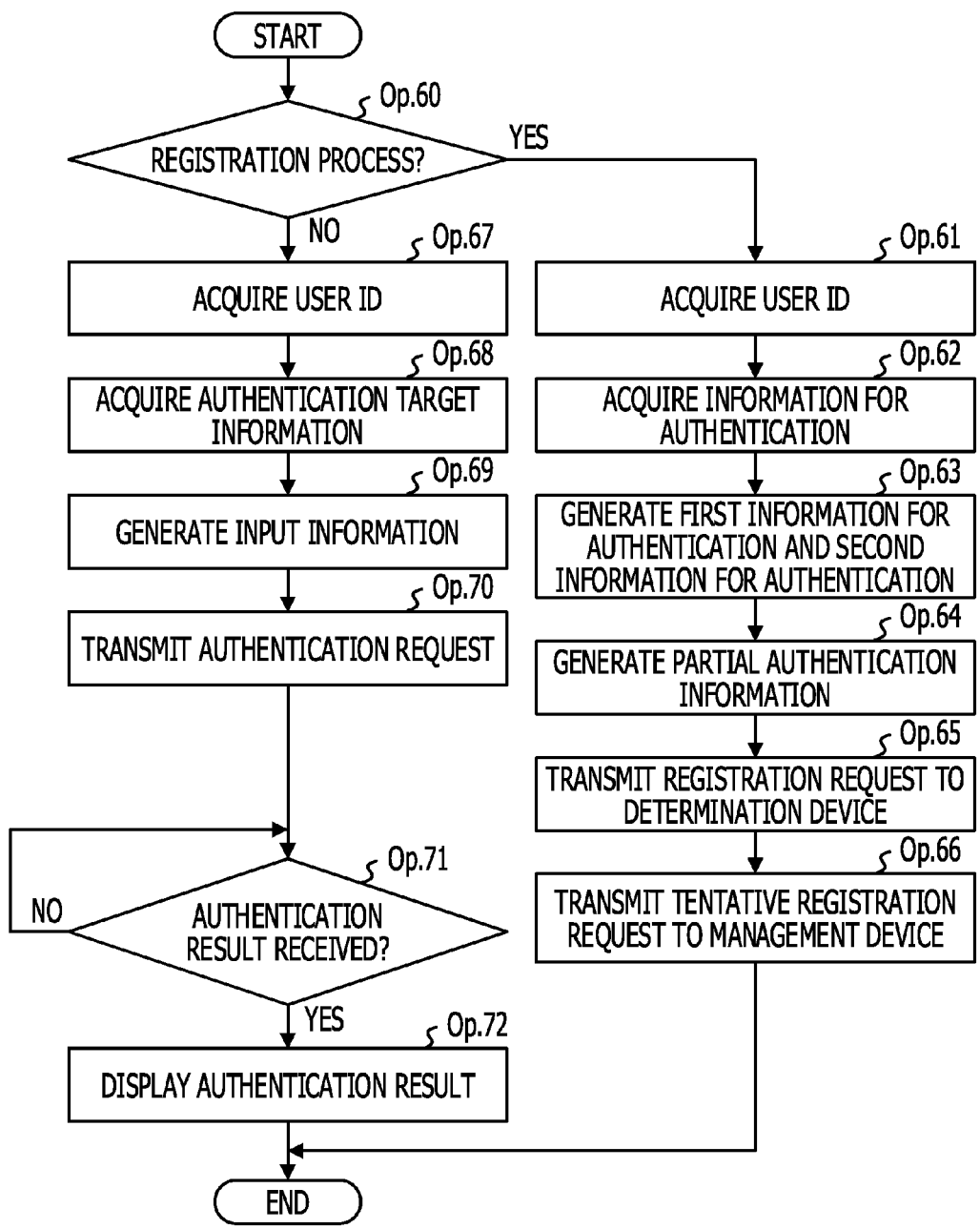
FIG. 20 is a flowchart illustrating a process performed by the terminal device according to the fourth embodiment.

Processes performed by the devices according to the fourth embodiment will now be described. FIG. 20 is a flowchart illustrating a process performed by the terminal device according to the fourth embodiment.

The control section 104 determines whether or not to perform the registration process (Op. 60). If, for instance, the user inputs a command for starting the registration process, the control section 104 determines to perform the registration process. If, on the other hand, the user does not input the command for starting the registration process, the control section 104 determines not to perform the registration process.

If the registration process is to be performed (if the query in Op. 60 is answered "YES"), the acquisition section 103 acquires a user ID (Op. 61). The user ID is acquired when it is input by the user or when information is read from a card in which an IC chip is built in. Next, the acquisition section 103 acquires the information for authentication (Op. 62). The information for authentication is acquired when a part of the user's body is photographed or when the information is read from the card in which the IC chip is built in. Op. 61 and Op. 62 may be performed in reverse order.

Next, the control section 104 generates the first information for authentication and the second information for authentication (Op. 63). The first information for authentication and the second information for authentication are generated in such a manner that the exclusive OR of the first information for authentication and the second information for authentication is the information for authentication.

Next, the encryption section 105 generates the partial authentication information (Op. 64). For example, the encryption section 105 computes the exclusive OR of the first information for authentication and the key information. For example, the exclusive OR of the information for authentication and a random number generated in accordance with the key information may be computed.

The transmitter section 102 transmits a registration request to the determination device 5' under the control of the control section 104 (Op. 65). The registration request includes the user ID and the partial authentication information. The transmitter section 102 then transmits a tentative registration request to the management device 4' under the control of the control section 104 (Op. 66). The tentative registration request includes the user ID and the second information for authentication. The terminal device 100 then terminates the registration process.

If, on the other hand, the control section 104 determines not to perform the registration process (if the query in Op. 60 is answered "NO"), the terminal device 100 performs the authentication process. As is the case with the first embodiment, the terminal device 100 may determine whether or not to perform the authentication process. First of all, the acquisition section 103 acquires the user ID (Op. 67). The acquisition section 103 then acquires the authentication target information (Op. 68). Op. 67 and Op. 68 may be performed in reverse order.

Next, the encryption section 105 generates the input information (Op. 69). For example, the encryption section 105 computes the exclusive OR of the authentication target information and the key information. For example, the encryption section 105 computes the exclusive OR of the authentication target information and a random number generated in accordance with the key information. The encryption method used to generate the authentication information is the same as the encryption method used to generate the input information. Further, the encryption method used to generate the authentication information uses the same key information as the encryption method used to generate the input information.

The transmitter section 102 transmits an authentication request to the management device 4' under the control of the control section 104 (Op. 70). The authentication request includes the user ID and the input information. The control section 104 then determines whether or not the result of authentication is received from the determination device 5' (Op. 71). The control section 104 waits until it receives the authentication result (if the query in Op. 71 is answered "NO"). When the authentication result is received (when the query in Op. 71 is answered "YES"), the control section 104 causes the display device to display the authentication result (Op. 72). The terminal device 100 then terminates the authentication process.

Figure 21:
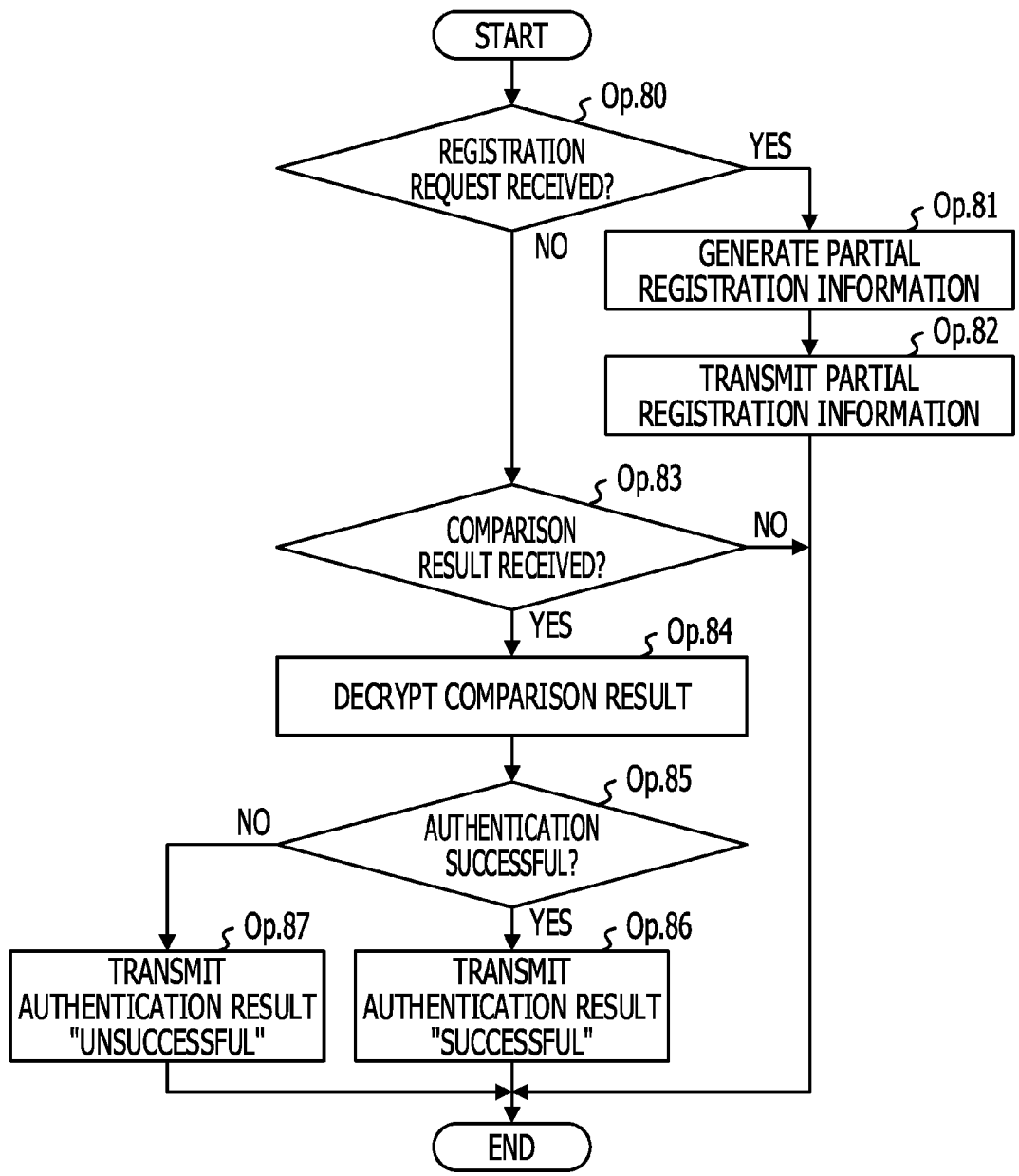
FIG. 21 is a flowchart illustrating a process performed by the determination device according to the fourth embodiment.

FIG. 21 is a flowchart illustrating a process performed by the determination device according to the fourth embodiment. The control section 503 determines whether or not the registration request is received from the terminal device 3' (Op. 80). This determination is based, for instance, on whether flag information indicative of the registration request is included in the information received by the receiver section 501.

If the registration request is received (if the query in Op. 80 is answered "YES"), the encryption section 504 generates the partial registration information (Op. 81). For example, the encryption section 504 acquires the user ID "A" included in the registration request and then acquires the key information "KA1" and key information "KA2" associated with the user ID "A" from the storage section 506. The key information "KA1" is shared with the terminal device 3'. The encryption section 504 then uses two pieces of key information to convert the encryption of the partial authentication information included in the registration request from the encryption with the key information "KA1" to the encryption with the key information "KA2".

The transmitter section 502 transmits the partial registration information, which is associated with the user ID, to the management device 4' (Op. 82). The determination device 500 then terminates the registration process.

If, on the other hand, the registration request is not received (if the query in Op. 80 is answered "NO"), the control section 503 determines whether or not the result of comparison between the input information and the registration information is received from the management device 4' (Op. 83). This determination is based, for instance, on whether flag information indicative of the comparison result is included in the information received by the receiver section 501.

If the comparison result is not received (if the query in Op. 83 is answered "NO"), processing comes to an end. If, on the other hand, the comparison result is received (if the query in Op. 83 is answered "YES"), the authentication section 505 decrypts the comparison result by using the two pieces of key information used (Op. 81) to generate the partial registration information (Op. 84). In accordance with the result of decryption and with the threshold value "T", the authentication section 505 determines whether or not the authentication is successful (Op. 85).

If the authentication is successful (if the query in Op. 85 is answered "YES"), the transmitter section 502 transmits the result of authentication "Successful" to the terminal device 3' (Op. 86). If, on the other hand, the authentication is unsuccessful (if the query in Op. 85 is answered "NO"), the transmitter section 502 transmits the result of authentication "Unsuccessful" to the terminal device 3' (Op. 87). The determination device 500 then terminates the authentication process.

Figure 22:
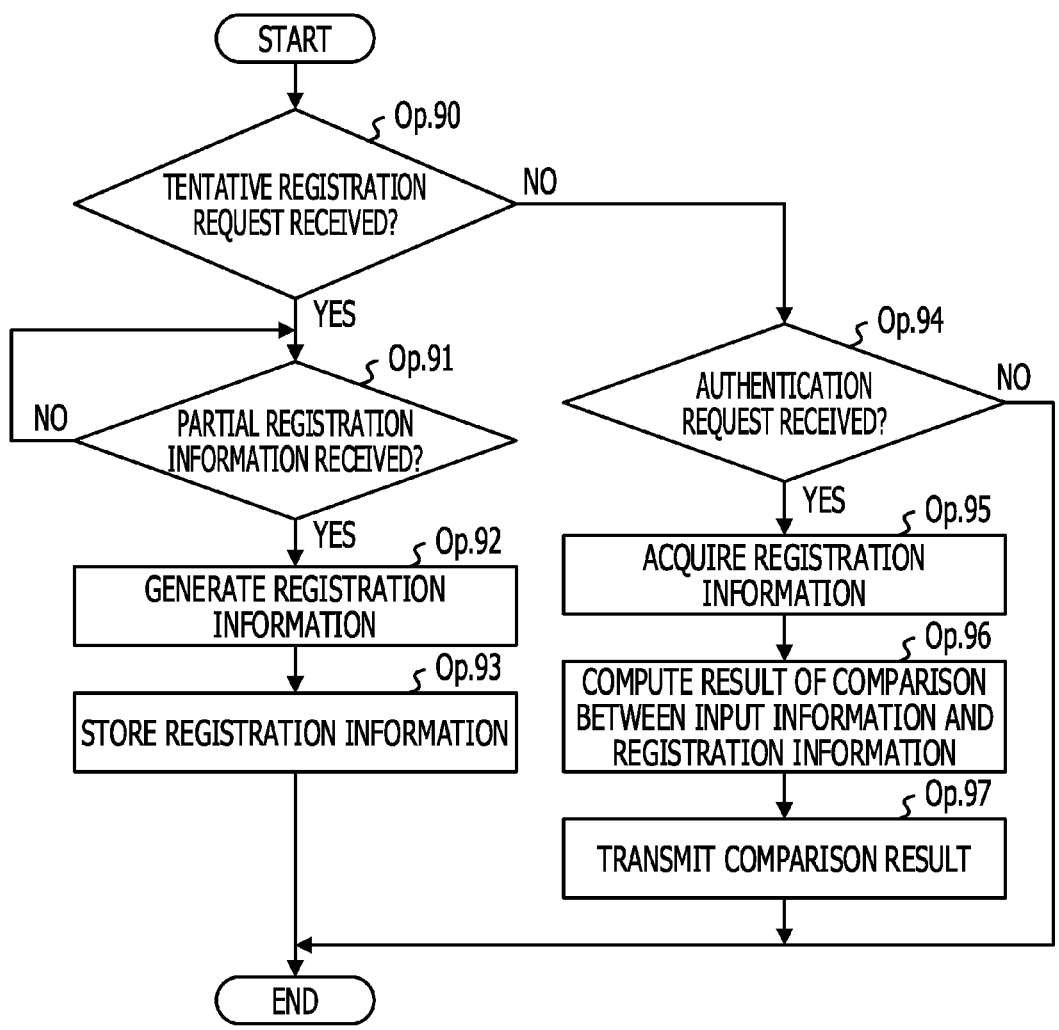
FIG. 22 is a flowchart illustrating a process performed by the management device according to the fourth embodiment.

FIG. 22 is a flowchart illustrating a process performed by the management device according to the fourth embodiment.

First of all, the control section 403 determines whether or not the tentative registration request is received from the determination device 5' (Op. 90). This determination is based, for instance, on whether flag information indicative of the tentative registration request is included in the information received by the receiver section 401.

If the tentative registration request is received (if the query in Op. 90 is answered "YES"), the control section 403 determines whether or not the partial registration information is received from the determination device 5' (Op. 91). The control section 403 waits until it receives the partial registration information (if the query in Op. 91 is answered "NO"). When the partial registration request is received (when the query in Op. 91 is answered "YES"), the control section 403 generates the registration information (Op. 92). For example, the control section 403 computes the exclusive OR of the partial registration information and the second information for authentication included in the tentative registration request. The control section 403 then stores the generated registration information and the user ID in the storage section 405 in association with each other (Op. 93). Subsequently, the management device 400 terminates the authentication process.

If, on the other hand, the tentative registration request is not received (if the query in Op. 90 is answered "NO"), the control section 403 determines whether or not the authentication request is received from the terminal device 3' (Op. 94). This determination is based, for instance, on whether flag information indicative of the authentication request is included in the information received by the receiver section 401.

If the authentication request is not received (if the query in Op. 94 is answered "NO"), processing comes to an end. If, on the other hand, the authentication request is received (if the query in Op. 94 is answered "YES"), the computation section 404 acquires the registration information associated with the user ID included in the authentication request from the storage section 405 (Op. 95).

Next, the computation section 404 computes the result of comparison between the registration information and the input information included in the authentication request (Op. 96). For example, the computation section 404 computes the exclusive OR of the registration information and the input information. The result of computation corresponds to information obtained when the hamming vector of the information for authentication and the authentication target information is encrypted with the two pieces of key information used for the generation of the partial registration information in the determination device 4' (Op. 91).

Next, the transmitter section 402 transmits the comparison result and the user ID to the determination device 5' (Op. 97). The management device 400 then terminates the authentication process.

As described above, the fourth embodiment makes it possible to register the registration information by a method different from those used in the other embodiments while the information for authentication is kept secret from the determination device 4'.

[Exemplary Hardware Configuration]

Figure 23:
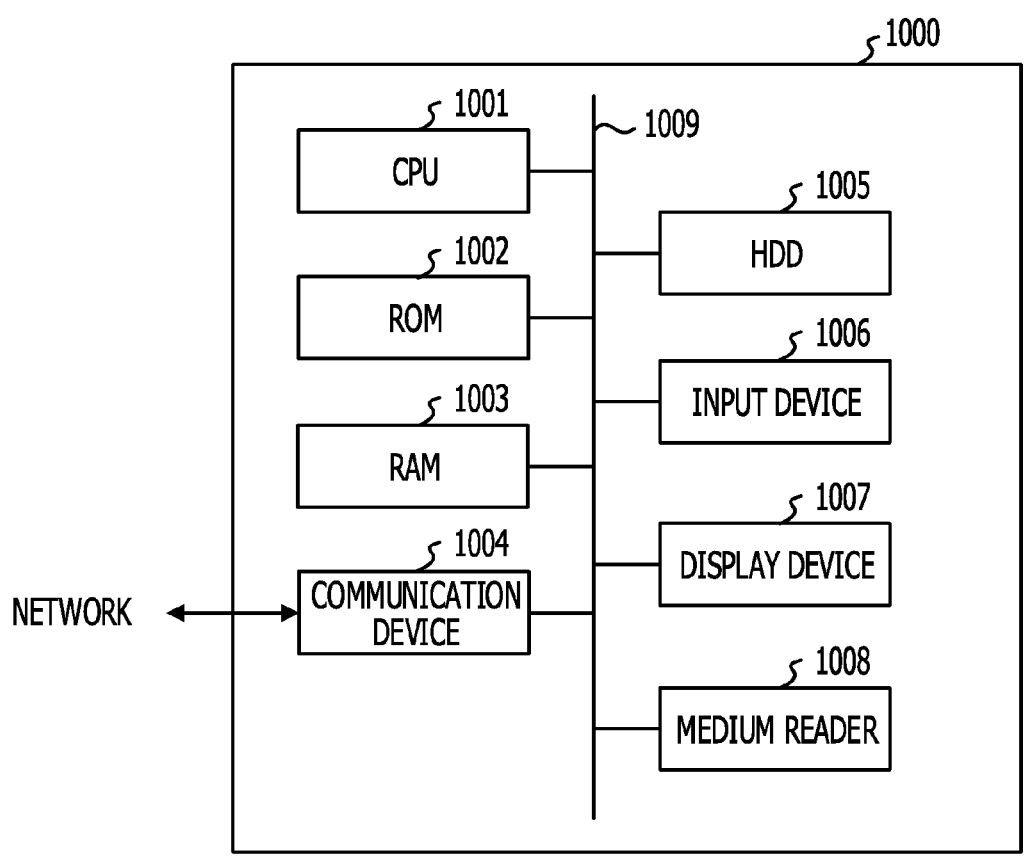
FIG. 23 is a diagram illustrating an exemplary hardware configuration of each relevant device.

FIG. 23 is a diagram illustrating an exemplary hardware configuration of each relevant device. The terminal device, authentication device, management device, and determination device according to each of the first, second, third, and fourth embodiments are respectively implemented by a computer. Hence, FIG. 23 illustrates the hardware configuration of a computer 1000 that functions as the terminal device, authentication device, management device, and determination device according to each embodiment.

The computer 1000 performs the registration process and authentication process according to each embodiment and functions as the terminal device, authentication device, management device, and determination device according to each embodiment. The computer 1000 includes a central processing unit (CPU) 1001, a read-only memory (ROM) 1002, a random-access memory (RAM) 1003, a communication device 1004, a hard disk drive (HDD) 1005, an input device 1006, a display device 1007, and a medium reader 1008. The above components are mutually connected through a bus 1009 and capable of exchanging data with each other under the management of the CPU 1001.

An authentication program describing the registration process or authentication process depicted in the flowcharts according to the individual embodiments is recorded on a recording medium readable by the computer 1000. The recording medium readable by the computer 1000 is, for example, a magnetic recording device, an optical disc, a magneto-optical recording medium, or a semiconductor memory. The magnetic recording device is, for example, a HDD, a flexible disk (FD), or a magnetic tape (MT).

The optical disc is, for example, a digital versatile disc (DVD), a DVD-RAM, a compact disc read-only memory (CD-ROM), or a compact disc recordable/rewritable (CD-R/RW). The magneto-optical recording medium is, for example, a magneto-optical disk (MO). When the authentication program is to be distributed, for example, a DVD, CD-ROM, or other portable recording medium on which the authentication program is recorded may be sold.

The medium reader 1008 of the computer 1000 that executes the authentication program describing the registration process and authentication process according to each embodiment reads the authentication program from the recording medium on which the authentication program is recorded. The CPU 1001 stores the read authentication program on the HDD 1005, the ROM 1002, or the RAM 1003.

The CPU 1001 is a central processing unit that controls the operations of all the devices according to each embodiment. The CPU 1001 reads the authentication program according to each embodiment from the HDD 1005 and executes the authentication program. The CPU 1001 functions as the control section for each device. As mentioned above, the authentication program may be stored on the ROM 1002 or the RAM 1003 as far as it is accessible by the CPU 1001.

The communication device 1004 functions as the receiver or transmitter section for each device under the control of the CPU 1001.

The HDD 1005 functions as the storage section for each device under the management of the CPU 1001. More specifically, the HDD 1005 stores information that is to be used in the registration process and the authentication process. As is the case with the authentication program, the information to be used in the registration process and the authentication process may be stored on the ROM 1002 or the RAM 1003 as far as it is accessible by the CPU 1001. Various items of information generated during the processes are stored, for instance, on the RAM 1003. In other words, the RAM 1003 functions as the storage section in some cases.

The input device 1006 accepts various inputs. The input device 1006 is, for example, a keyboard or a mouse. The display device 1007 displays various items of information. The display device 1007 is, for example, a display.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication device comprising:
   a memory; and
   a hardware processor coupled to the memory and configured to:
   when a registration request including authentication information to be used during authentication is received from a terminal device, generate registration information using the authentication information and key information and store the registration information into the memory, and
   when an authentication request including input information to be handled as a target of the authentication is received from the terminal device, compare the registration information with the input information, generate an authentication result by applying the key information to a comparison result between the registration information and the input information, and transmit the authentication result to the terminal device, wherein the registration information is generated by encrypting the authentication information with the key information, wherein the encrypting is performed using a computation method in which the encrypting is reset by performing the further encrypting two times with the same key information, wherein the registration information is a result of an exclusive OR of the authentication information and the key information, wherein the comparison result is a result of an exclusive OR of the input information and the registration information, and wherein the authentication result is a result of an exclusive OR of the comparison result and the key information.

2. The authentication device according to claim 1, wherein the authentication information, input information, and the key information are binary data.

3. An authentication system comprising:

a determination device including a first memory and a first processor configured to:

when a registration request including authentication information to be used during authentication is received from a terminal device, generate registration information using the authentication information and key information and transmits the registration information, and when a comparison result between the registration information and input information to be handled as a target of the authentication is received, generate an authentication result by applying the key information to the comparison result, and transmit the authentication result to the terminal device; and a management device including a second memory and a second processor configured to:

when the registration information is received from the determination device, store the registration information into the second memory, and when an authentication request including the input information is received from the terminal device, compute the comparison result between the input information and the registration information and transmit the comparison result to the determination device, wherein the registration information is generated by encrypting the authentication information with the key information, wherein the encrypting is performed using a computation method in which the encrypting is reset by performing the further encrypting two times with the same key information, wherein the registration information is a result of an exclusive OR of the authentication information and the key information, wherein the comparison result is a result of an exclusive OR of the input information and the registration information, and wherein the authentication result is a result of an exclusive OR of the comparison result and the key information.

4. An authentication method, comprising:

receiving, by a hardware processor, a registration request including authentication information to be used during authentication from the terminal device;

generating by the hardware processor, registration information using the authentication information and key information;

storing the registration information into a memory;

receiving, by the hardware processor, an authentication request including input information to be handled as a target of the authentication from the terminal device;

comparing, by the hardware processor, the registration information with the input information;

generating, by the hardware processor, an authentication result by applying the key information to a comparison result between the registration information and the input information; and transmitting, by the hardware processor, the result of the authentication to the terminal device, wherein the registration information is generated by encrypting the authentication information with the key information, and wherein the encrypting is performed using a computation method in which the encrypting is reset by performing the further encrypting two times with the same key information, wherein the registration information is a result of an exclusive OR of the authentication information and the key information, wherein the comparison result is a result of an exclusive OR of the input information and the registration information, and wherein the authentication result is a result of an exclusive OR of the comparison result and the key information.

5. The authentication method according to claim 4, wherein the authentication information, input information, and the key information are binary data.

* * * * *